United States Patent
Li et al.

(10) Patent No.: US 11,636,231 B2
(45) Date of Patent: Apr. 25, 2023

(54) METHODS AND APPARATUS FOR IN-MEMORY DEVICE ACCESS CONTROL

(71) Applicants: QUALCOMM Incorporated, San Diego, CA (US); Candace Sachi Chun, San Diego, CA (US)

(72) Inventors: Yanru Li, San Diego, CA (US); Dexter Tamio Chun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 282 days.

(21) Appl. No.: 16/937,907

(22) Filed: Jul. 24, 2020

(65) Prior Publication Data
US 2022/0027520 A1 Jan. 27, 2022

(51) Int. Cl.
*G06F 21/79* (2013.01)
*G06F 11/07* (2006.01)
*G06F 12/14* (2006.01)
*G06F 21/31* (2013.01)

(52) U.S. Cl.
CPC .......... *G06F 21/79* (2013.01); *G06F 11/0772* (2013.01); *G06F 11/0787* (2013.01); *G06F 12/1425* (2013.01); *G06F 12/1458* (2013.01); *G06F 21/31* (2013.01)

(58) Field of Classification Search
CPC ............. G06F 11/0772; G06F 11/0787; G06F 12/1425; G06F 12/1458; G06F 21/31; G06F 21/79
See application file for complete search history.

(56) References Cited

U.S. PATENT DOCUMENTS

| 8,775,757 B2* | 7/2014 | Polzin ................. G06F 12/14 711/E12.091 |
| 8,893,267 B1* | 11/2014 | Sathe ................. G06F 21/76 711/163 |
| 9,612,977 B2* | 4/2017 | Berenbaum .......... H04L 9/3226 |

(Continued)

OTHER PUBLICATIONS

Search Query Report from IP.com (performed Jul. 29, 2022) (Year: 2022).*

(Continued)

*Primary Examiner* — Sharon S Lynch
(74) *Attorney, Agent, or Firm* — The Marbury Law Group/Qualcomm

(57) ABSTRACT

Various embodiments may include methods and systems for providing secure in-memory device access of a memory device by a system-on-a-chip (SOC). Various methods may include receiving a configuration message from the SOC for configuring a memory access control of the memory device, and configuring the memory access control based on the configuration message. Various embodiments may include receiving an access request message from the SOC requesting access to a memory base address and a memory access range of a memory cell array of the memory device, wherein the access request message includes a read/write operation. Various embodiments may include comparing the access request message with the configured memory access control to determine whether the access request message is allowable. Various embodiments may further include performing the read/write operation in response to determining that the access request message is allowable.

20 Claims, 15 Drawing Sheets

(56) References Cited

U.S. PATENT DOCUMENTS

| | | | |
|---|---|---|---|
| 10,387,333 B2* | 8/2019 | Chun | G06F 21/602 |
| 10,591,975 B2* | 3/2020 | Li | G06F 9/4403 |
| 10,909,234 B2* | 2/2021 | Zhang | H04L 63/0846 |
| 2013/0019305 A1* | 1/2013 | Berenbaum | G06F 21/44 |
| | | | 726/19 |
| 2014/0089617 A1* | 3/2014 | Polzin | G06F 12/14 |
| | | | 711/E12.091 |
| 2014/0310536 A1* | 10/2014 | Shacham | G06F 21/78 |
| | | | 713/193 |
| 2017/0177858 A1* | 6/2017 | Zhang | H04L 63/0846 |
| 2018/0121125 A1* | 5/2018 | Zeng | G06F 3/0659 |
| 2018/0189195 A1* | 7/2018 | Chun | G06F 12/1425 |
| 2019/0129493 A1* | 5/2019 | Li | G06F 15/7817 |

OTHER PUBLICATIONS

Search Query Report from IP.com (performed Feb. 3, 2023) (Year: 2023).*

International Search Report and Written Opinion—PCT/US2021/042148—ISA/EPO—dated Oct. 20, 2021. 14 pages.

* cited by examiner

METHODS AND APPARATUS FOR IN-MEMORY DEVICE ACCESS CONTROL

BACKGROUND

Traditionally, system memory access control has been implemented as a proprietary function within the application processor (AP) or system-on-a-chip (SOC), either by the master side such as through implementation of a memory management unit (MMU), input/output MMU, or system MMU, or via the slave side such as through implementation of a memory protection unit (MPU) in front of a double data rate (DDR) subsystem. To implement secure configuration of and accesses to memory by an SOC, an SOC may include hardware and software to supervise and protect memory access, ensure memory access control processes do not impede or degrade system performance, and provide protections to prevent inter-process corruption, leakage, harm, and or security attacks.

New SOCs are being developed for evolving use cases, such as Internet-of-Things (IoT), wearable devices, and other small form factor devices. Such use cases may benefit offloading some portions of hardware and/or software from an SOC to external devices and/or hardware to reduce the physical size, cost, and power consumption of SOCs. However, offloading hardware and software to external devices that have been conventionally implemented locally within an SOC may introduce security risks and performance degradation.

SUMMARY

Various aspects include methods and memory devices implementing the methods for indicating access pass/violation feedback to an SOC as part of a read/write transaction sequence of a memory device by the SOC. Various aspects may include receiving a configuration message from the SOC for configuring a memory access control of the memory device, configuring the memory access control based on the configuration message, receiving an access request message from the SOC requesting access to a memory base address and a memory access range of a memory cell array of the memory device, in which the access request message may include a read/write operation, comparing the access request message with the configured memory access control to determine whether the access request message is allowable, and performing the read/write operation in response to determining that the access request message is allowable.

In some aspects, the configuration message may include a configuration security domain ID, and the access request message may include a requested security domain ID. In some aspects, the configuration message may be an encoded JEDEC message including the configuration security domain ID, and the access request message may be an encoded JEDEC message including the requested security domain ID. In some aspects, comparing the access request message with the configured memory access control to determine whether the access request message is allowable may include determining whether the configuration security domain ID matches the requested security domain ID, and, in response to determining that the configuration security domain ID matches the requested security domain ID, determining that the access request message is allowable, and transmitting a notification to the SOC indicating that the access request message is allowable. Such aspects may further include, in response to determining that the configuration security domain ID does not match the requested security domain ID, determining that the access request message is not allowable, storing error information including the memory base address, the memory access range, and the requested security domain ID, transmitting a notification to the SOC indicating that the access request message is not allowable, and transmitting the error information to the SOC in response to receiving an error interrupt request from the SOC.

Some aspects may further include receiving an unlock password from the SOC, determining whether the received unlock password matches a password within a set of acceptable passwords stored in the memory device, and unlocking memory device gate logic to allow the memory access control to receive the configuration message in response to determining that the received unlock password matches a password within the set of acceptable passwords. Some aspects may further include receiving, from the SOC, a lock command configured to set a lock bit within a register of the memory device, and setting the lock bit to prevent configuration changes to the configured memory access control.

Further aspects include a memory device having a processor configured to perform operations of any of the methods summarized above. Further aspects include a memory device having means for performing functions of any of the methods summarized above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of the various embodiments.

DETAILED DESCRIPTION

Figure 1:
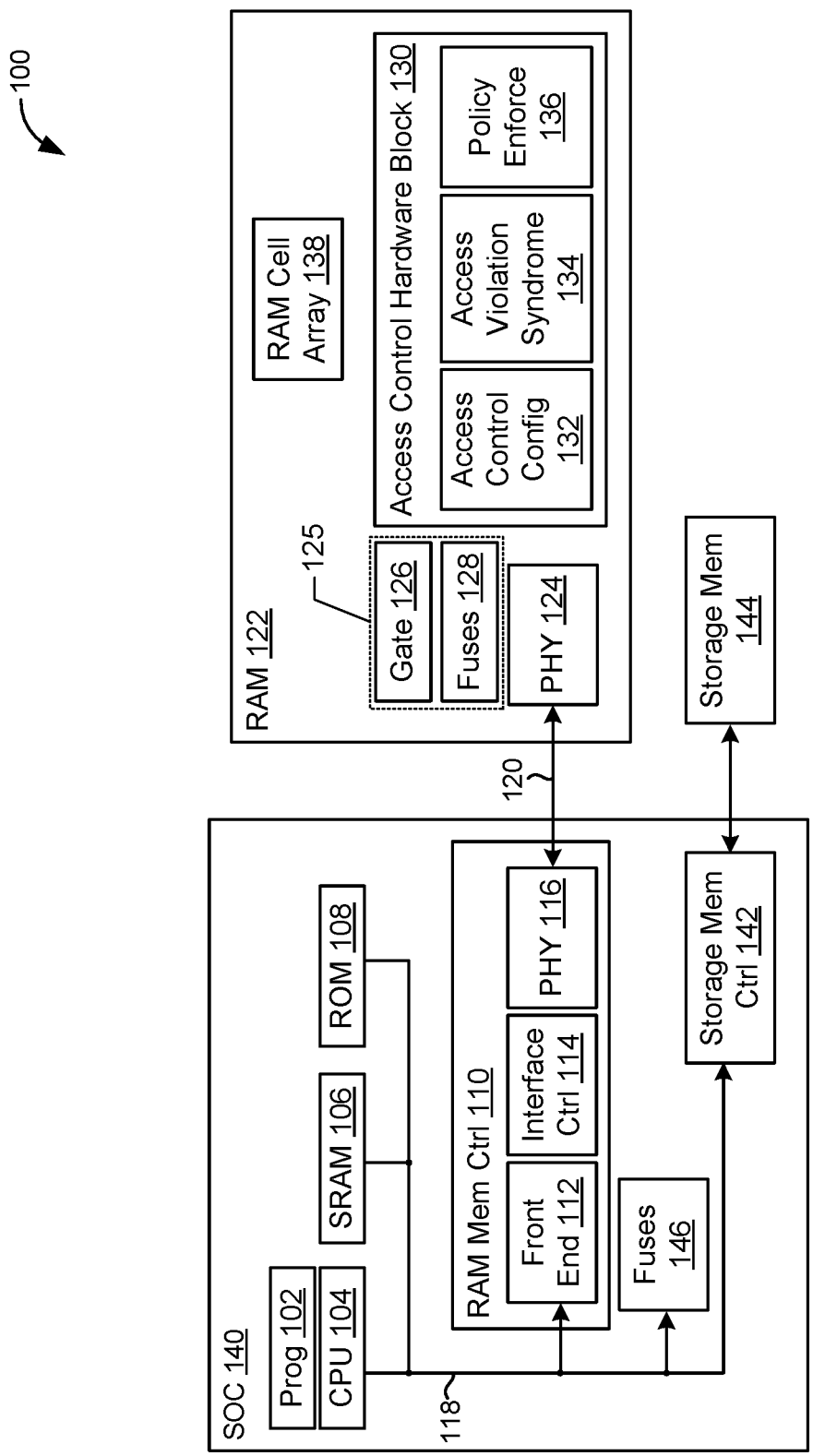
FIG. 1 is a component block diagram illustrating an example computing system 100 for providing secure in-memory device access control according to some embodiments.

Various embodiments will be described in detail with reference to the accompanying drawings. Wherever possible, the same reference numbers will be used throughout the drawings to refer to the same or like parts. References made to particular examples and embodiments are for illustrative purposes and are not intended to limit the scope of the various embodiments or the claims.

Various embodiments provide solutions for providing secure in-memory device access control to enable offloading some portions of hardware and/or software to external devices to reduce SOC size, cost, and power consumption without introduce security risks and performance degradation.

The term "wireless device" is used herein to refer to any one or all of cellular telephones, smartphones, portable computing devices, personal or mobile multimedia players, autonomous vehicles, wireless communication elements within autonomous and semiautonomous vehicles, wireless devices affixed to or incorporated into various mobile platforms, multimedia Internet-enabled cellular telephones, and similar electronic devices that include a memory, wireless communication components and a programmable processor.

The term "system-on-a-chip" (SOC) is used herein to refer to a single integrated circuit (IC) chip that contains multiple resources or processors integrated on a single substrate. A single SOC may contain circuitry for digital, analog, mixed-signal, and radio-frequency functions. A single SOC also may include any number of general purpose or specialized processors (digital signal processors, modem processors, video processors, etc.), memory blocks (such as ROM, RAM, Flash, etc.), and resources (such as timers, voltage regulators, oscillators, etc.). SOCs also may include software for controlling the integrated resources and processors, as well as for controlling peripheral devices.

The term "system-in-a-package" (SIP) is used herein to refer to a single module or package that contains multiple resources, computational units, cores or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP also may include multiple independent SOCs coupled together via high speed communication circuitry and packaged in close proximity, such as on a single motherboard or in a single wireless device. The proximity of the SOCs facilitates high speed communications and the sharing of memory and resources.

In conventional computing devices, memory access control components and circuitry are physically located within those computing devices. For example, to access an external random-access memory (RAM), an SOC will include components and circuitry for memory access control within the physical layout of the SOC such that access to the RAM is controlled by the SOC.

Various embodiments implement secure memory access control within a memory device instead of within an SOC. Various embodiments may include enabling access control within a memory device, conveying the security domain of the initiator in each transaction to the memory, enforcing access control in the memory device including configuration, policy enforcement, and error indication, checking access error indication as part of read/write sequence, and establishing access control to the memory device as part of system initialization sequence.

Various embodiments include security mechanisms, such as gates and fuses, within an SOC that allow the SOC to configure memory access control located within a memory device that is external to the physical layout of the SOC but in electrical communication with the SOC. By offloading memory access control from an SOC to a memory device or devices, SOC physical size, cost, and power consumption may be reduced. Additional benefits of implementing memory access control within a memory device instead of an SOC include eliminating the need for proprietary access control schemes across a broad range of SOC suppliers and therefore increasing standardization and communicability, allowing the use of low or medium complexity microprocessor chips in secure memory systems, reusing access control firmware/software across a multitude of microprocessors, application processors (APs), or SOCs, and developing new, more complex memory devices (e.g., in/near memory compute devices) capable of including functionality such as compute and access control.

FIG. 1 is a component block diagram illustrating an example computing system 100 for providing secure in-memory device access control instead of within an SOC according to some embodiments. Various embodiments include implementing a memory access control hardware block within a memory device, such as a RAM 122 that may be implemented within a system electrically communicating with a processing device (e.g., AP, SOC, SIP, etc.). Various embodiments may be implemented in a form of memory device, such as a dynamic RAM (DRAM), storage memory, non-volatile RAM (NVRAM), or any other type of memory device or module that may be in electrical communication with an SOC 140 within a system.

An SOC may be implemented within a system having one or more secure RAM devices. Thus, additional handshaking protocols or processes may be performed to establish a level of security between an insecure SOC and a secure RAM. For example, additional processes may be performed to establish trust between the SOC 140 and the RAM 122 over a bus 120

(e.g., high-speed bus, RAM bus, etc.). The SOC may include a trusted program 102, a central processing unit (CPU) 104, an static RAM (SRAM) 106, a read-only memory (ROM) 108, a RAM memory controller 110 including a front end 112, an interface control 114, and a physical interface (PHY) 116, a storage memory controller 142 to access a storage memory 144, and fuses 146. The RAM 122 may include a PHY 124 and a RAM cell array 138. The RAM 122 may further include a trust hardware block 125 including a gate 126 and fuses 128. The RAM 122 may further include an access control hardware block 130 including an access control configuration block 132, an access violation syndrome block 134, and a policy enforce block 136. The SOC 140 may be electrically coupled to the PHY 124 of the RAM 122 via the PHY 116 to communicate handshaking protocols for allowing the SOC 140 to configure the access control hardware block 130. The trust hardware block 125, including the gate 126 and fuses 128, of the RAM 122 may be implemented to establish trust between the SOC 140 and the RAM 122. Once trust is established, the SOC 140 may then configure the access control hardware block 130 to provide memory protection according to various embodiments.

In some embodiments, access control hardware block 130 within the RAM 122 may be similar in functionality to conventional access control physically within an SOC and may perform processes including checking the initiator, the security domain, the physical address, and the access type to determine whether it is read or write access, and then allowing memory access into the RAM cell array 138 for authorized transactions. Gate 126 may be unlocked before the access control hardware block 130 may be initialized via access control configuration block 132. Unlock may occur when the trusted program 102 running on the CPU 104 sends an unlock password to the RAM 122, in which the password is checked against a value residing in the fuses 128. The password may be secret and may be provisioned into the RAM fuses 128 in advance. If password unlock is successful, the gate 126 may open read/write access to the access control configuration block 132, and the trusted program 102 may initialize the access control configuration block 132 the same as if it were contained within the SOC according to conventional methods. After completing the initialization, the gate 126 may be returned to a locked state. Additional changes to the access control configuration block 132 may follow this unlock/change/lock procedure at all times. Once the access control hardware block 130 is initialized, the policy enforce block 136 may monitor and regulate mission mode traffic between the SOC 140 and the RAM cell array 138.

Figure 2:
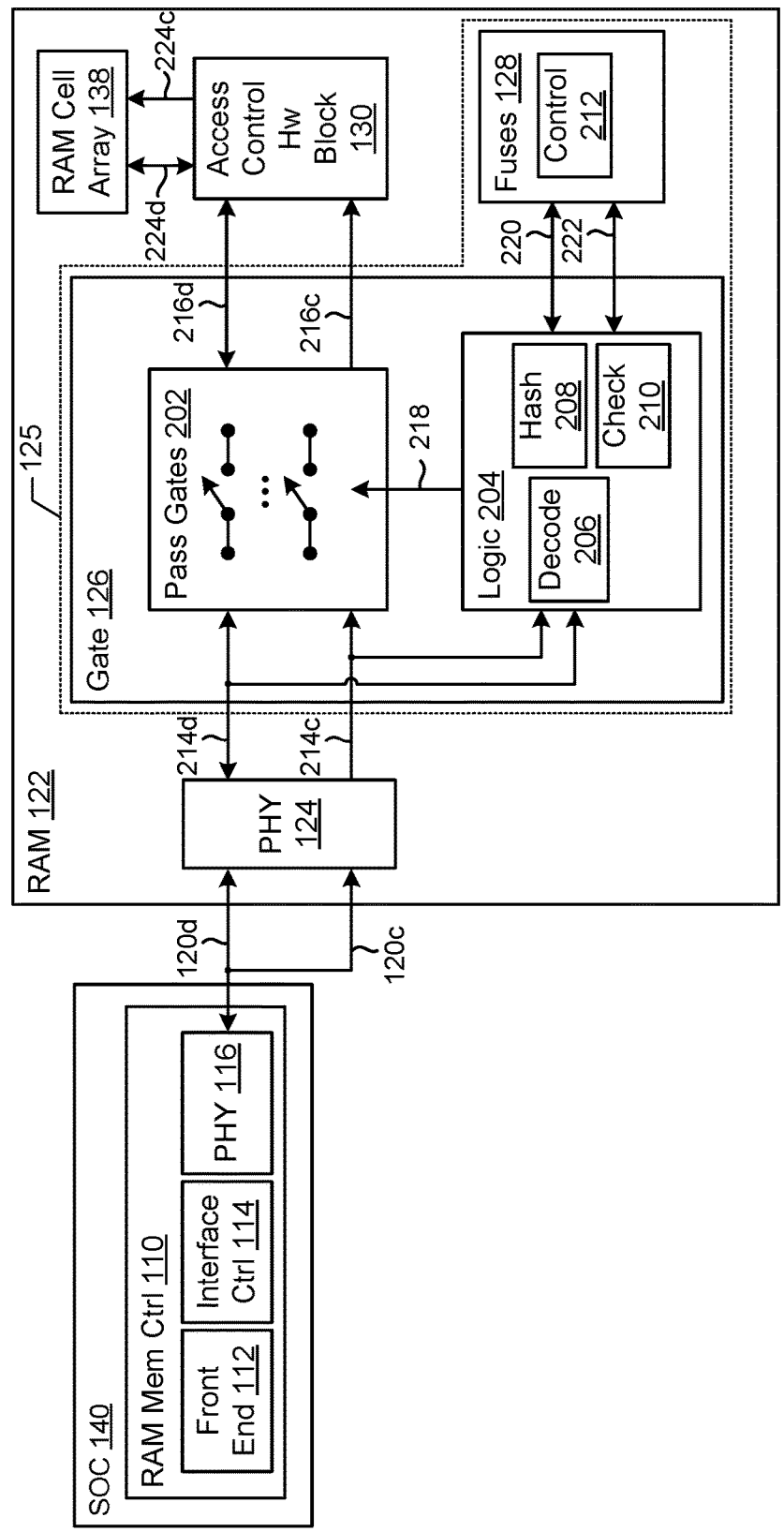
FIG. 2 is a component block diagram illustrating an example computing system 200 including a gate for providing secure in-memory device access control according to some embodiments.

FIG. 2 is a component block diagram illustrating an example computing system 200 showing details of the gate 126 coupled to logic 204 in the trust hardware block 125 configured for providing secure in-memory device access control according to some embodiments.

With reference to FIGS. 1 and 2, the gate 126 may include one or more pass gates 202 and control logic 204. The pass gates 202 may include one or more in-line switches that connect/disconnect the PHY 124 to the access control hardware block 130 that may provide access to RAM cell array 138. As mentioned above, the PHY 124 may provide the connections associated with the bus 120. Connections 120d correspond to data signals, and connections 120c correspond to address/control signals. The PHY 124 may provide the data signals associated with connections 120d to the pass gates 202 and the control logic 204 of the trust hardware block 125 via connections 214d. The PHY 124 may provide the address/control signals associated with connections 120c to the pass gates 202 and the control logic 204 of the trust hardware block 125 via connections 214c.

As further illustrated in FIG. 2, each pass gate 202 may include a first contact and a second contact. The first contact may be electrically coupled to the corresponding data connection(s) 214d and address/control connections 214c, and the second contact on the other side of the gate or switch may be electrically coupled to corresponding gated data connection(s) 216d and gated address/control connections 216c. The control logic 204 may be electrically coupled to each pass gate 202 via connection(s) 218 through which gate control signals may be provided to open and close the individual switches. In this regard, the "locked state" of the trust hardware block 125 may correspond to the operational state in which the pass gates 202 are opened to prevent access to gated connections 216d and 216c.

Alternative embodiments of the pass gate 202 function may include a bidirectional transceiver with an output enable controlled by the gate control 218, a bidirectional transceiver that may be powered on/off via a power rail under the control of the gate control 218, or a bidirectional latch/register that may have either output enable or power rail under the control of the gate control 218. The circuits employed may be purposefully designed for bidirectional signaling, or may consist of two separate circuits for handling each (e g, forward and reverse) direction corresponding to write and read data traffic.

In some embodiments, when the memory device 122 is powered down, the control logic 204 may receive a corresponding command from a power manager controller of the SOC 140 and, in response, send a "lock" gate control signal via connection(s) 218 to the pass gates 202. The gate control signals may include individual signals (e.g., one gate control wire for one pass gate) or a single signal (e g., one gate control for all of the pass gates). In some embodiments, the pass gates 202 may be replaced by a power switch that powers-up or powers-down the access control hardware block 130 to RAM cell array 138. In response to the "lock" gate control signal, the pass gates 202 may be opened to prevent access to gated connections 216d and 216c. In this manner, when the memory device is booted, the gate mechanism 126 is in the "locked state" with the pass gates 202 in the open position to initially prevent read/write operations from accessing the RAM memory cell array 138.

As described with reference to FIG. 1, when the system 200 is booted up and the trusted program 102 begins executing on the CPU 104, the unlock password stored in fuse(s) 146 on the SOC 140 may be fetched and provided to the controller 110, which transmits the value through the PHY 116 to the PHY 124. The control logic 204 in the trust hardware block 125 may fetch the pass gate value provisioned in fuse(s) 128 via, for example, a fuse data bus 220 and a fuse control bus 222 in the trust hardware block 125. As illustrated in FIG. 2, the trust hardware block 125 and/or the fuse(s) 128 may include a controller 212 to facilitate communication with the control logic 204. The control logic 204 may compare the pass gate value to the unlock password received from the SOC 140. If the unlock password matches the pass gate value, the control logic 204 may send an "unlock" gate control signal to the pass gates 202 via connection(s) 218. In response to the "unlock" gate control signal. the pass gates 202 may be closed, thereby connecting data connection(s) 214d and address/control connections 214c to gated connection(s) 216d and gated address/control connections 216c, respectively. In this "unlocked state", the gate mechanism 126 may provide unrestricted access to the access control hardware block 130 via data bus 224d and control bus 224c.

As mentioned above, the password exchange between the SOC 140 and the gated RAM 122 may be implemented in various ways. In some embodiments, a simple unencrypted password exchange may be implemented via fuse(s) 146, 128. In some embodiments, the secure password exchange may employ any desirable encryption algorithm(s) to improve the level of security through more sophisticated or additional handshaking protocols or processes. As illustrated in FIG. 2, when the secure password exchange employs encryption, the control logic 204 in the trust hardware block 125 may include logic modules to support a decode function (block 206), a hash function (block 208), and a check function (block 210).

The decode logic 206 in the trust hardware block 125 may receive control and address information via the bus 214c, and data via the bus 214d. In some embodiments, a predetermined and/or standardized protocol may be implemented for controlling the control logic 204, exchanging information such as keys and passwords, or the initialization and programming of elements such as fuses 128. For example, there may be a specific command on the control and address bus 214d that may be decoded in by the decode logic 206 and can then initiate the specific command function. Some embodiments may include a unique command and data associated with each type of function, such as reset gate logic, program fuse data in multiple locations, a program private key, a program password, program self-destruct failed tries, an enable tamper mechanism, an input key modulus p, an input key base g, a retrieve hash, an unlock unencrypted password, an unlock encrypted password, etc.

The decode logic 206 in the trust hardware block 125 may be responsible for parsing and triggering the appropriate operations in response to the incoming control, address, and data. As illustrated in FIG. 2, the control and address 214c and data 214d connections arrive at pass gates 202 and, if unlocked, may propagate to the access control hardware block 130, which may perform similar predetermined and/or standardized mission-mode operations such as RAM cell array read, RAM cell array write, RAM cell array page select, RAM cell array repair, RAM device configuration, PHY advanced configuration, and any other functionality that is unrelated to tamper-proofing functions.

A hash function 208 may perform modulo arithmetic operations for a secret key exchanging procedure and may include lookup tables and/or modulo addition sequential and parallel computation logic. A check function 210 may be included in the control logic 204 of the trust hardware block 125 for comparing the password sent from the SOC 140 against a local copy previously programmed into local fuses 128 in the trust hardware block 125. Decryption logic (not shown) may be included within the check function 210 of the trust hardware block 125 to allow the SOC 140 to send the password using encryption to prevent a snooper from viewing the password as it travels via external bus 120. If the SOC 140 has encrypted the password, then the decryption logic may first decrypt the password using a shared secret key derived during a secure exchange process such as the Diffie-Hellman method.

In some embodiments, in the event that multiple unsuccessful unlock events have occurred the fuses 128 in the trust hardware block 125 may be activated to permanently disable the control logic 204, thereby preventing future access to the memory.

Figure 3:
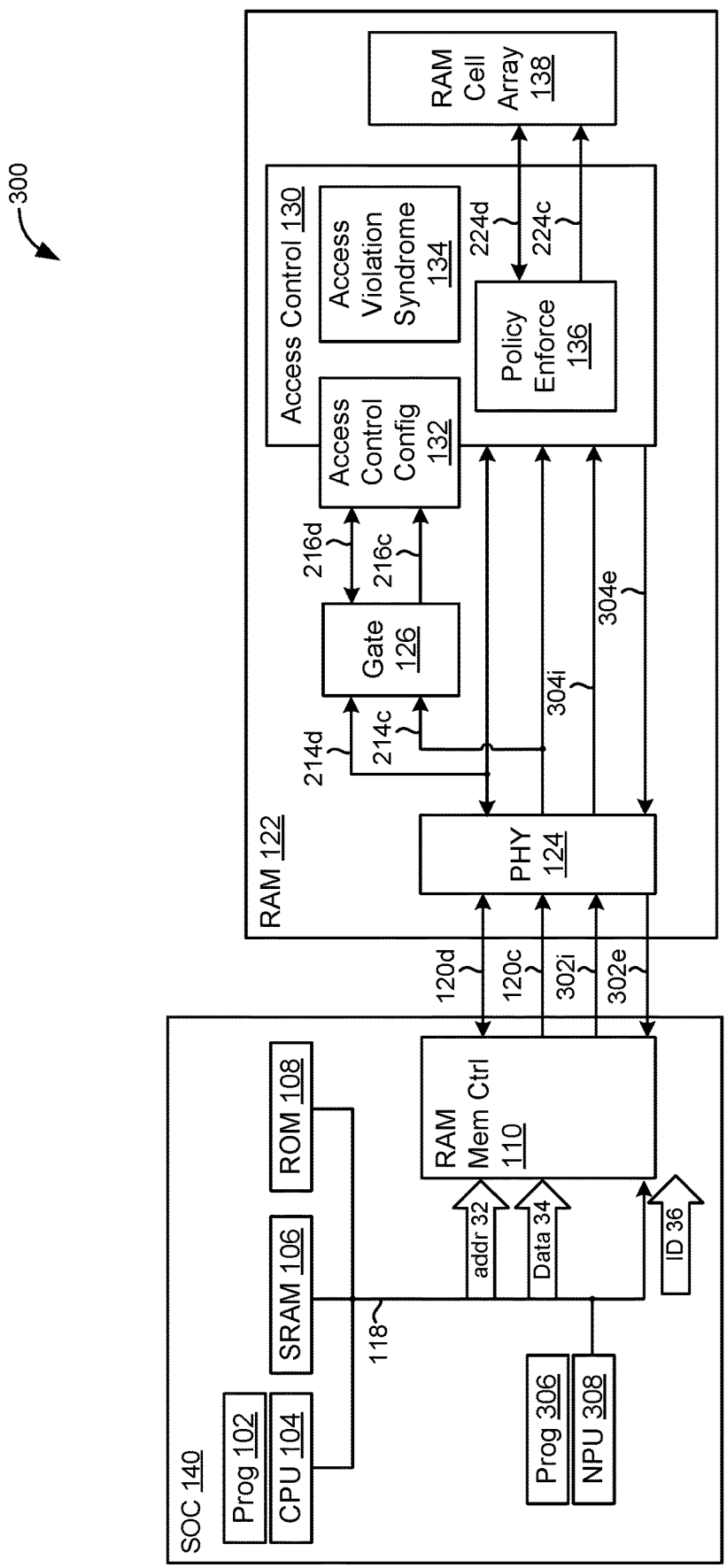
FIG. 3 is a component block diagram illustrating an example computing system 300 for providing secure in-memory device access control according to some embodiments.

FIG. 3 is a component block diagram illustrating an example computing system 300 for providing secure in-memory device access control according to some embodiments. With reference to FIGS. 1-3, the SOC 140 may include processing units implementing various trusted programs in addition to the trusted program 102 implemented by the CPU 104. For example, the SOC 140 may include a network processing unit (NPU) 308 implementing a trusted program 306 in which the NPU 308 is electrically connected to the bus 118.

The SOC 140 in electrical communication with the RAM 122 may configure the access control hardware block 130 each time the SOC performs a new access attempt of the RAM cell array 138. Prior to configuring the access control hardware block 130, the SOC 140 and RAM 122 may be initialized to configure mission mode memory access filtering. For example, a key exchange and establishing a secure channel can be performed prior to the SOC 140 configuring and initializing the access control hardware block 130. A secure entity or component of the SOC 140 may include the key or password to open the gate 126. As described above, the SOC 140 may transmit the key to the RAM 122 to open the gate 126 to then allow the SOC 140 to configure the access control hardware block 130 for initializing the proper access of the RAM cell array 138. After configuration of the access control hardware block 130, the SOC 140 may set a lock bit within the RAM 122 to prevent further modification to the access control hardware block 130. The secure entity of the SOC 140 may also issue commands to the access control hardware block 130 to change the configuration again for subsequent future memory access attempts after the exchange of memory information via the established secure channel. In other words, the SOC 140 may unlock the gate 126 using a key or password/passcode stored in a secure entity of the SOC 140, configure the access control hardware block 130 with the appropriate memory access information, lock the configuration to prevent modification of the secure channel while access to the RAM cell array 138 is ongoing, and enable the access control hardware block 130 to begin accessing the RAM cell array 138 after the secure channel has been configured and locked.

The RAM 122 may provide register interfaces for side control by the SOC 140. The RAM 122 may include a lock bit for each access region within the RAM cell array 138 to prevent further modification of the configuration. The lock bits may be set, enabled, or otherwise configured after SOC-to-RAM initialization to lock in the most recent configuration of the access control hardware block 130. The RAM 122 may include an enable bit for each access region of the RAM cell array 138, such that setting an enable bit allows for the enforcement (e.g., via policy enforce block 136) of the configured access control hardware block 130.

The SOC 140 may configure the access control hardware block 130 to access specific portions, or domains, of the RAM cell array 138 by encoding the access information within a command sent to the RAM 122. For example, the SOC 140 may encode information regarding a memory base address (e.g., addr 32), a memory data size and/or range (e.g., data 34), and an access domain ID (e.g., ID 36) within a command transmitted to the RAM 122 via the data and access/control channels (e.g., connections 120d, 120c, 214d, 214c, 216d, 216c). The base address and size information for each access region may be expressing according to a memory device accessing scheme, such as in a granularity of memory cell rows of the RAM cell array 138. In some examples, the access domain ID/security domain ID may be transmitted to the RAM 122 across a bus separate from the data and access/control channels. For example, the RAM memory controller 110 may transmit the security domain ID to the PHY 124 and subsequently to the access control hardware block 130 via connections 302*i* and 304*i*.

The encoded command may include information to access the correct configuration for each access region or domain. The encoded command may include a security ID or a domain ID, and the policy enforce block 136 may check the security ID to verify which domains the SOC 140 is attempting to access. The encoded command may also include information to specify the read and write access permissions for each supported security domain of the RAM cell array 138. In other words, the encoded command may specify whether to read memory information from a security domain, write memory information to a security domain, or both read from and write to a security domain. For example, the RAM 122 may support four security domains that may be mapped to four SOC 140 side security domains, such as AP, Graphics, digital signal processing (DSP), and secure processor. For each access control region, there may be four bits to indicate read permission for each security domain, and four bits to indicate write permission for each security domain. The SOC 140 may configure how the security domain ID is mapped to the SOC 140 security domain. For example, the SOC 140 may define or otherwise attribute a security ID value of 0 to an AP high-level operating system (HLOS), 1 to an AP secure entity, 2 to graphics, and 3 to a secure processor. The read/write access permissions can be specified in the encoded command for each specific security domain within the RAM cell array 138.

In some embodiments, the access violation syndrome block 134 of the access control hardware block 130 may monitor for and report any errors occurring prior to and during access control configuration and during memory exchange across and established secure channel after the access control hardware block 130 is configured. The RAM 122 may include an error interrupt pin that may transmit an interrupt signal to the SOC 140 when an error has been observed by the access violation syndrome block 134. For example, the access violation syndrome block may observe that one or more errors have occurred during memory access (e.g., reading from and/or writing to security domains within the RAM cell array 138) after the access control hardware block 130 has been appropriately configured. In response to observing and recording the error(s), the access control may then send an error interrupt signal to the RAM memory controller 110 of the SOC 140 from the PHY 124 via the connections 304*e* and 302*e*. The error indication/interrupt signal/pin (e.g., connection 302*e*) may be sensed by the SOC 140 at least one clock cycle after the read or write command is executed. For read errors, the error indication may be part of the read response, such that the read response may include an undefined value on the data bus (e.g., connection 120*d*). For write errors, an additional clock cycle may be required to sense the error interrupt pin, such that the access violation syndrome block 134 may analyze whether a write command was incorrectly executed or unable to be properly executed, and then generate an indication to transmit to the SOC 140 indicating that the write command resulted in one or more errors. The error indication generated by the access violation syndrome block 134 may include a type of error (e.g., read/write error), an error address corresponding to the RAM cell array 138, and which security domain ID the error corresponds to. For example, the security domain ID reported in the error interrupt signal may identify which of the security domains (e.g., AP HLOS, AP secure entity, graphics, secure processor, etc.) of the SOC 140 were trying to access the RAM cell array 138 when the error(s) occurred.

The error indication may include this information for one or more errors occurring as a result of a single read or write operation. For example, the access violation syndrome block 134 may store a series of errors that may have occurred before the SOC 140 has been clocked to sense at least one of the errors that occurred. Thus, creating a buffer of errors via the access violation syndrome block 134 may allow the SOC 140 to receive a comprehensive report of errors in one clock cycle without missing any errors that may have occurred one or more clock cycles prior to the latest observed error. In some embodiments, the error indication reported to the SOC 140 may include an indication of where a memory access command may have been rejected along the data and/or control connections at the access control configuration block 132, policy enforce block 136, and RAM cell array 138. In some examples, the access violation syndrome block 134 may include a counter that counts the number of errors that have occurred as a result of one or more memory access commands.

Figure 4:
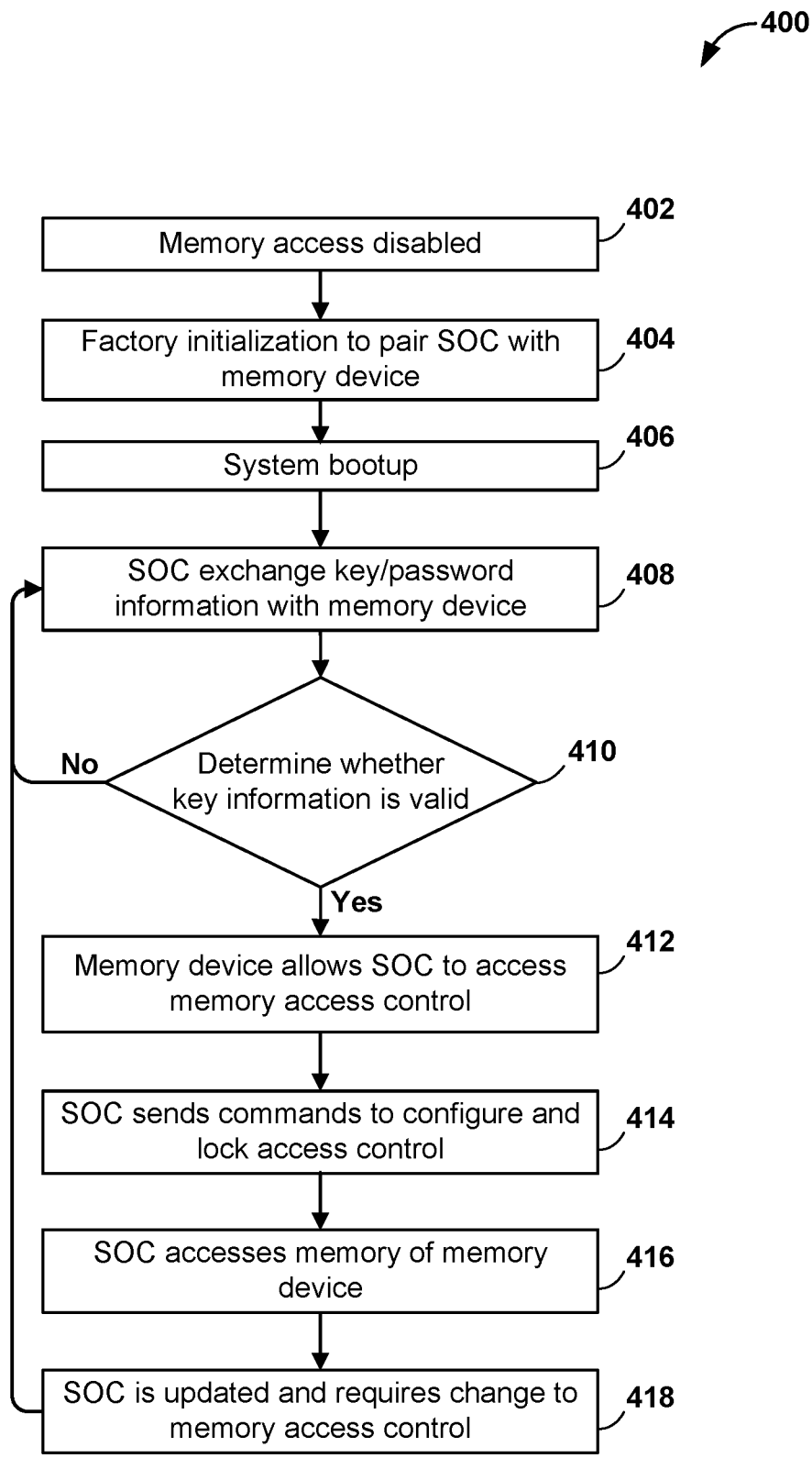
FIG. 4 is a process flow diagram illustrating a method 400 for providing secure in-memory device access control according to some embodiments.

FIG. 4 is a process flow diagram illustrating a method 400 for providing secure in-memory device access control according to some embodiments. With reference to FIGS. 1-4, the operations of the method 400 may be performed by a processor (e.g., CPU 104, NPU 308) of an SOC (e.g., SOC 140) configuring an external memory device (e.g., RAM 122).

The order of operations performed in blocks 402-418 is merely illustrative, and the operations of blocks 402-418 may be performed in any order and partially simultaneously in some embodiments. In some embodiments, the method 400 may be performed by a processor of a device independently from, but in conjunction with, an external memory device. For example, the method 400 may be implemented as a software module executing within a processor of an SOC or in dedicated hardware within an SOC that issues commands to establish secure memory channels and access memory of an external memory device and is otherwise configured to take actions and store data as described.

In block 402, the access to a memory device may be disabled. At default, a memory device designed to have in-memory secure access control may be in a disabled state, in which the memory device may be configurable by an external processing device such as an SOC. For example, as described with reference to FIGS. 1-3, the memory device may be the RAM 122, which may have the pass gates 202 in an open state such that any processing device (e.g., SOC 140) will not have access to the memory (e.g., RAM cell array 138) upon being electrical coupled/paired with the RAM 122. The initial condition of the memory device may also have default values for keys/passcodes/passwords not initialized or otherwise programmed such that a private key may have a default state of empty/unprogrammed or a default value of 0. For example, the fuses 128 of the RAM 122 may have a default private key value of 0.

In block 404, the SOC and the memory device may be paired. Factory initialization may occur before field implementation of a system including the SOC and the external memory device, such that the SOC and memory device are programmed with or issued specific keys/passwords/passcodes to allow for establishing secure access channels between the SOC and the memory device. The initialization may include burning private key(s), password(s), and a number of maximum access attempts prior to locking the SOC out from the memory device. For example, after a number of failed access attempts by an SOC, the memory device may disable the access control (e.g., by preventing a state change of gates/keeping gates in an unlocked state), preventing potential hacking attacks by an unauthorized SOC in electrical communication with the memory device.

In block 406, the system including an SOC and pair external memory device may be booted. System bootup may include pairing the SOC and memory device physically (i.e. in a hard-wired system) and then powering the system on. For example, the SOC 140 may be hardwired to the RAM 122 such that the SOC 140 and RAM 122 are physically located and coupled within a single system housing.

In block 408, once the SOC and memory device are powered and booted, the SOC may exchange key/password information with the trust hardware block 125 of the memory device as described with reference to FIG. 2. The memory device being in a default locked state, the trust hardware block 125 may receive key/password information from the SOC and logic 204 may compare the received key/password information to information stored in fuse memory 128 to verify whether the SOC has authority to configure the access control policy of the access control hardware block 130 of the memory device. If the logic 204 verifies the SOC authority, the trust hardware block 125 may then unlock the gate 126 for the SOC to configure the access control of the access control hardware block 130. The SOC may randomly select from a set of public keys to transmit to the memory device to allow the memory device to determine if access should be granted. The set of public keys may be configured and stored by the SOC as described in block 404.

In determination block 410, the logic 204 of the trust hardware block 125 may determine whether the key information provided by the SOC is valid. In some embodiments, the logic 204 of the trust hardware block 125 may determine whether the key is valid in determination block 410 by comparing against private key information initialized in the memory device according to the processes described in block 404. As described with reference to FIG. 2, as determined by the control logic 204 of the trust hardware block 125, the memory device will remain in a locked state (i.e. gate open) if the key transmitted by the SOC is invalid, or the memory device will change to an unlocked state (i.e. gate closed) if the key is valid.

In response to determining that a key provided by the SOC is not valid (i.e., determination block 410="No"), the SOC may attempt further access attempts by selecting other public keys as described in block 408 until a certain number of access attempts may occur and the memory device remains in a locked state.

In response to determining that a key provided by the SOC was valid (i.e., determination block 410="Yes"), the trust hardware block 125 may unlock to establish a secure connection with the SOC and to allow the SOC to access the access control hardware block 130 for configuration purposes prior to issuing read/write commands to memory (e.g., RAM cell array 138) in block 412. This process may be performed by the SOC and paired memory device as described with reference to FIG. 2. In some embodiments, granting access by the SOC may include unlocking registers of the memory device for configuring access control.

In block 414, the SOC may send commands to the memory device to configure and subsequently lock memory access control of the access control hardware block 130. As described with reference to FIG. 3, the SOC may issue encoded commands to the memory device to configure access control of the access control hardware block 130) in preparation of performing read/write memory operations across a secure channel. Encoded commands transmitted by the SOC and received by the access control configuration block of the memory device can include access configuration parameters including base address, size or address range, and security domain ID to determine which secure entities of the SOC are attempting to access specific portions of memory and which and how much memory is to be accessed within the memory device. The processor of the SOC may issue read/write operations to the access control configuration block 132 in the access control hardware block 130 to prepare the secure channel for exchanging memory information.

In some embodiments, read/write commands may be transmitted to the memory device from the SOC according to JEDEC memory standards. For example, implementing JEDEC standards may include transmitting read/write commands over a JEDEC CMD and DATA bus, in which cmd opcode* specifies if the operation is a read or write. For example, tables 1 and 2 illustrate a write command to configure the address space of the access control configuration block to define the access configuration parameters (e.g., base address, address range, security domain ID) using the JEDEC standard in which read, write, Cas-2, MRW-1, and MRW-2 (mode register write) are existing JEDEC commands. Write Special and Cas-2 Special may be commands that are modified JEDEC protocol commands used to program the register space of the access control configuration block of the memory device.

TABLE 1

| Cmd | CS | CA0 | CA1 | CA2 | CA3 | CA4 | CA5 | CA6 | CK |
|---|---|---|---|---|---|---|---|---|---|
| Write Special | | cmd* | cmd* | cmd* | | | | | 1 |
| | | | | | | | | | 2 |

TABLE 2

| Cmd | CS | CA0 | CA1 | CA2 | CA3 | CA4 | CA5 | CA6 | CK |
|---|---|---|---|---|---|---|---|---|---|
| Cas-2 Special | | cmd* | cmd* | cmd* | | | | | 1 |
| | | | | | | | | | 2 |

As a result of the SOC executing the commands as shown in tables 1 and 2, 32 bytes of register space of the access control configuration are configured to define the access configuration parameters. The commands shown in tables 1 and 2 may be repeated as many times as necessary to configure the additional address spaces within the access control configuration block for each security domain.

In some embodiments, JEDEC protocols may be utilized in various formats depending on the application of the system including the SOC and memory device, such that the memory device may be standardized or application specific. For example, tables 3 and 4 illustrate a series of commands to configure the address space of the access control configuration block to define the access configuration parameters using existing JEDEC commands.

TABLE 3

| Cmd | CS | CA0 | CA1 | CA2 | CA3 | CA4 | CA5 | CA6 | CK |
|---|---|---|---|---|---|---|---|---|---|
| Write | | cmd* | cmd* | cmd* | | | | | 1 |
| | | | | | | | | | 2 |

TABLE 4

| Cmd | CS | CA0 | CA1 | CA2 | CA3 | CA4 | CA5 | CA6 | CK |
|---|---|---|---|---|---|---|---|---|---|
| Cas-2 | | cmd* | cmd* | cmd* | | | | | 1 2 |

In addition to the commands shown in tables 3 and 4, the SOC may transmit an instruction to the access control configuration block within the access control hardware block 130 of the memory device specifying the access configuration address to be modified. For example, the SOC may transmit a 32-byte command including 8 bytes of data defining the access configuration address and 24 bytes of data defining the access configuration parameters. This instruction may be transmitted alongside, simultaneously, or at substantially the same time that the SOC executes the Cas-2 command, such that the access control configuration block within the access control hardware block 130 of the memory device may associate the Write and Cas-2 command with the received access configuration address and parameter information. As such, the access control configuration block within the access control hardware block 130 may be configured to specifically monitor for the receipt of an instruction including the access configuration address and parameter information across one bus interface when receiving a Cas-2 command across another bus interface. The commands shown in tables 3 and 4 may be repeated as many times as necessary to configure the additional address spaces within the access control configuration block for each security domain.

Tables 1-4 are merely illustrative of an example to allow the SOC to write access configuration parameters to the address space of the access control configuration block. A read command may be executed to read access configuration parameter information from a register space of the access control configuration block within the access control hardware block 130 in a similar manner as the write command (i.e. replace "write" with "read" in the JEDEC commands in tables 1-4).

The SOC may configure the access configuration parameters by writing to specific address spaces with the access control configuration block within the access control hardware block 130 of the memory device, as described above. The access configuration parameters may define the allowable types of accesses performed by the SOC after the access control configuration is set up and locked in to establish a secure channel between the SOC and the memory device. For example, the SOC may perform read and write operations corresponding to base addresses, address ranges, and security domain IDs as previously configured within the access control of the access control hardware block 130. If the SOC attempts to make a request to read or write data to, for example, a security domain that was not defined when configuring the access configuration parameters, then the access control hardware block 130 will record an error and send an interrupt to the SOC including information related to error (i.e. as described with reference to the access violation syndrome block 134 of FIG. 3).

Once access control of the access control hardware block 130 has been configured according to the commands issued by the SOC, the SOC may also issue commands to the access control hardware block 130 of the memory device to set a lock bit to lock in the current access control configuration to prevent modification to the configuration. In some embodiments, the SOC may issue a command to the memory to unset the lock bit to allow for changes in the access control configuration, such as to implement new policy changes or memory changes. The SOC may also issue commands to the memory device to set an enable bit to allow for enforcement of the currently configured access control (i.e., establishing a secure channel between the SOC and the memory device according to the configured access control configuration block).

In block 416, the SOC may access the memory array of the memory device. For example, after configuring the access control hardware block 130, the SOC 140 may access the RAM cell array 138 to perform read/write operations. Encoded commands transmitted by the SOC and received by the memory device can include additional information including security domain IDs to determine which secure entities of the SOC are attempting to access specific portions of memory within the memory device. The processor of the SOC may issue page open/close operations without access protection, and may issue read/write operations with access protection.

In some embodiments, read/write commands may be transmitted to the memory device from the SOC according to JEDEC memory standards. For example, implementing JEDEC standards may include transmitting read/write commands over a JEDEC CMD and DATA bus, in which cmd opcode* specifies the type of operation (e.g., read, write, or column address strobe). The JEDEC standard may be adapted, modified, utilized, or otherwise implemented to include access control ID** that specifies the security domain. For example, tables 5-7 illustrate a read command according to the JEDEC standard, in which the Cas-3 is a new additional JEDEC command to include the access control ID specifying the security domain. Read, Write, Cas-2, MRW-1, and MRW-2 (mode register write) are existing JEDEC commands.

TABLE 5

| Cmd | CS | CA0 | CA1 | CA2 | CA3 | CA4 | CA5 | CA6 | CK |
|---|---|---|---|---|---|---|---|---|---|
| Read | | cmd* | cmd* | cmd* | | | | | 1 2 |

TABLE 6

| Cmd | CS | CA0 | CA1 | CA2 | CA3 | CA4 | CA5 | CA6 | CK |
|---|---|---|---|---|---|---|---|---|---|
| Cas-2 | | cmd* | cmd* | cmd* | | | | | 1 2 |

TABLE 7

| Cmd | CS | CA0 | CA1 | CA2 | CA3 | CA4 | CA5 | CA6 | CK |
|---|---|---|---|---|---|---|---|---|---|
| Cas-3 | | cmd* | cmd* | cmd* | ID** | ID** | ID** | ID** | 1 2 |

The result of executing the encoded commands Read, Cas-2, and Cas-3 by the SOC to the access control of the memory device is reading 32 bytes of data from the memory location corresponding to the security domain ID specified in the Cas-3 command. Tables 5-7 are merely illustrative of an example to allow the SOC to read 32 bytes from the memory device. A write command may be executed to write 32 bytes to a memory location corresponding to the security domain ID in a similar manner as the read command (i.e. replace "read" with "write" in the JEDEC commands).

In some embodiments, JEDEC protocols may be utilized in various formats depending on the application of the system including the SOC and memory device, such that the memory device may be standardized or application specific. For example, tables 8-11 illustrate a series of commands to read 32 bytes of data from the memory device.

TABLE 8

| Cmd | CS | CA0 | CA1 | CA2 | CA3 | CA4 | CA5 | CA6 | CK |
|---|---|---|---|---|---|---|---|---|---|
| Write | | cmd* | cmd* | cmd* | | | | | 1 |
| | | | | | | | | | 2 |

TABLE 9

| Cmd | CS | CA0 | CA1 | CA2 | CA3 | CA4 | CA5 | CA6 | CK |
|---|---|---|---|---|---|---|---|---|---|
| Cas-2 | | cmd* | cmd* | cmd* | | | | | 1 |
| | | | | | | | | | 2 |

TABLE 10

| Cmd | CS | CA0 | CA1 | CA2 | CA3 | CA4 | CA5 | CA6 | CK |
|---|---|---|---|---|---|---|---|---|---|
| Read | | cmd* | cmd* | cmd* | | | | | 1 |
| | | | | | | | | | 2 |

TABLE 11

| Cmd | CS | CA0 | CA1 | CA2 | CA3 | CA4 | CA5 | CA6 | CK |
|---|---|---|---|---|---|---|---|---|---|
| Cas-2 | | cmd* | cmd* | cmd* | | | | | 1 |
| | | | | | | | | | 2 |

The SOC may transmit an instruction to the access control of the memory device specifying the security domain ID. For example, the SOC may transmit a 32-byte command including 1 byte of data to specific the security domain ID, and in which the other 31 bytes are ignored, irrelevant, or contain information for purposes other than for identifying the security domain. This instruction may be transmitted alongside, simultaneously, or at substantially the same time that the SOC executes the Cas-2 command, such that the access control of the memory device may associate the Write and Cas-2 command with the specified security domain ID. As such, the access control may be configured to specifically monitor for the receipt of an instruction including the security domain ID across one bus interface when receiving a Cas-2 command across another bus interface. For example, as described with reference to FIG. 3, the access control hardware block 130 may receive a Cas-2 command across the connections 216d, 216, and may receive security domain ID across the connection 304i. Tables 8-11 are merely illustrative of an example to allow the SOC to read 32 bytes from the memory device. A write command may be executed to write 32 bytes to a memory location corresponding to the security domain ID in a similar manner as the read command (i.e. replace "read" with "write" in the JEDEC commands). To reduce overhead, an additional mode of operation is once the security domain ID has been received by access control hardware block 130, subsequent read or write commands may be successfully received which correspond to the most recent security domain ID without the need to re-send a new security domain ID. The SOC 140 may take advantage of this opportunity by sending a plurality of read or write transactions to the RAM 122 all belonging to the same security domain ID, e.g. access control hardware block 130 will retain and apply the current security domain ID to subsequent read or write transactions until a new security domain ID is received. Bundling transactions with the same ID can therefore eliminate unnecessary security domain ID setup in tables 5, 6, and 7.

Tables 12-14 illustrate another example format of implementing JEDEC protocols to specify security domain ID(s).

TABLE 12

| Cmd | CS | CA0 | CA1 | CA2 | CA3 | CA4 | CA5 | CA6 | CK |
|---|---|---|---|---|---|---|---|---|---|
| MRW-1 | | cmd* | cmd* | cmd* | | | | ID** | 1 |
| | | Mode addr | Mode addr | Mode addr | Mode addr | Mode addr | Mode addr | Mode addr | 2 |

TABLE 13

| Cmd | CS | CA0 | CA1 | CA2 | CA3 | CA4 | CA5 | CA6 | CK |
|---|---|---|---|---|---|---|---|---|---|
| MRW-2 | | cmd* | cmd* | cmd* | | | | ID** | 1 |
| | | | | | | | ID** | ID** | 2 |

TABLE 14

| Cmd | CS | CA0 | CA1 | CA2 | CA3 | CA4 | CA5 | CA6 | CK |
|---|---|---|---|---|---|---|---|---|---|
| Read | | cmd* | cmd* | cmd* | | | | | 1 |
| | | | | | | | | | 2 |

Tables 12-14 are merely illustrative of an example to allow the SOC to read 32 bytes from the memory device. A write command may be executed to write 32 bytes to a memory location corresponding to the security domain ID in a similar manner as the read command (i.e. replace "read" with "write" in the JEDEC commands). Again, the most recent security domain ID can remain active, and the SOC 140 can bundle (issue consecutive) read or write transactions corresponding to the same security domain ID and reduce the overhead spent in tables 12 and 13.

Referring back to FIG. 4, in block 418, the SOC may implement a new access control policy, program, or have may have had memory buffer allocation updated, and therefore may require the memory device access control to be reconfigured based on the update SOC memory buffer allocation. When a determination that the SOC memory buffer allocation has been reconfigured or updated, the processes described in block 408-416 may be repeated to reconfigure the access control of the memory device. Implementing an SOC with an updated memory that is not reflected to the memory device access control will result in errors, and therefore requires the memory device to be reconfigured to adapt to the updated memory allocation for the SOC side use case.

Figure 5:
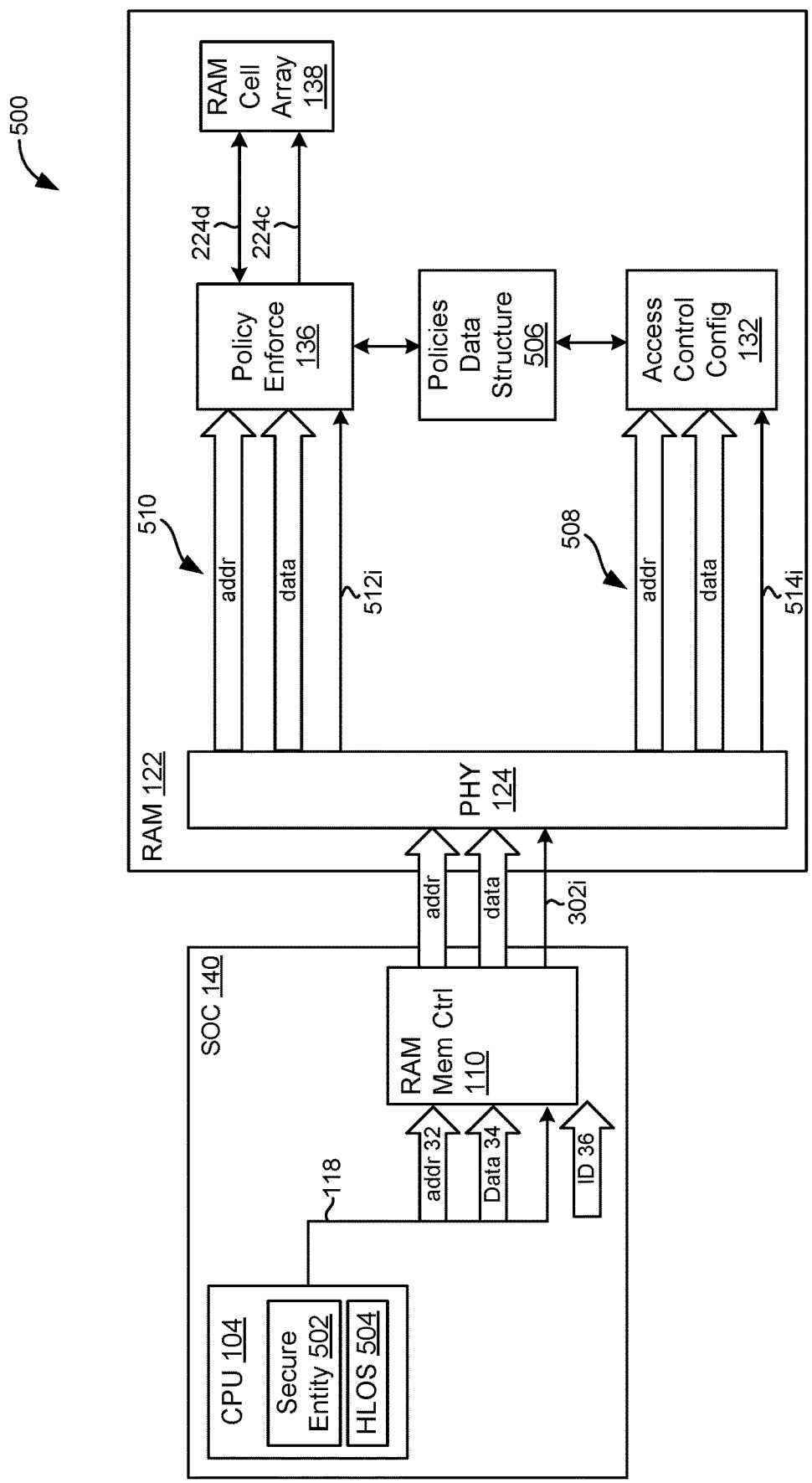
FIG. 5 is a component block diagram illustrating an example computing system 500 including data and configuration transaction pathways for providing secure in-memory device access control according to some embodiments.

FIG. 5 is a component block diagram illustrating an example computing system 500 including data and configuration transaction pathways for providing secure in-memory device access control according to some embodiments. With reference to FIGS. 1-5, the system 500 may include the CPU 104, which may include a secure entity (e.g., fuses, trust zone) 502 and an HLOS 504. The system 500 may include the RAM 122, which may include policies data structure 506. The system may include various hardware blocks and pathways to implement configuration mode transactions and mission mode data transactions, where both sets of transactions are relayed through the same interface PHY 124.

Configuration mode data transactions may be relayed by the PHY 124 to the access control configuration block 132, where the pathway 508 includes connections to relay address and data information, as well as connections 514i to relay access domain information. The data relayed through the pathway 508 may include base address, size or address range, and security domain ID to configure the access control configuration block 132 in preparation of mission mode data transactions. The configuration transactions relayed across the pathway 508 may be performed as described with reference to block 414 of the method 400 (FIG. 4).

Mission mode data transactions may be relayed by the PHY 124 to the policy enforce block 136, where the pathway 510 includes connections to relay address and data information, as well as connections 512i to relay access domain information. The information relayed through the pathway 510 may include address information and data to read or write to a specific location within the RAM cell array 138. The mission mode data transactions relayed across the pathway 510 may be performed as described with reference to block 416 of the method 400 (FIG. 4).

Figure 6:
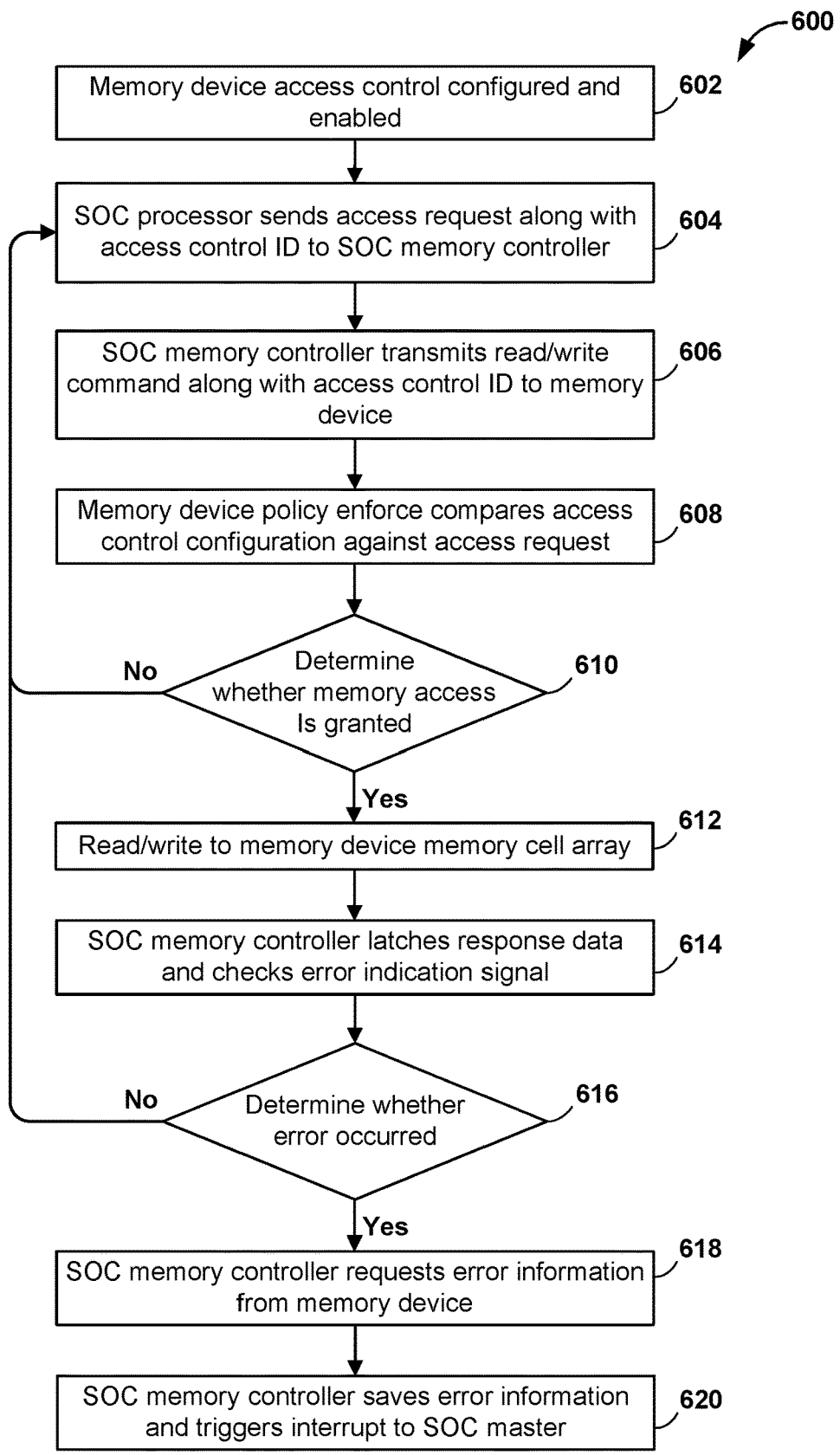
FIG. 6 is a process flow diagram illustrating a method 600 for monitoring access violations of a secure in-memory device according to some embodiments.

FIG. 6 is a process flow diagram illustrating a method 600 for monitoring access violations of a secure in-memory device according to some embodiments. With reference to FIGS. 1-6, the operations of the method 600 may be performed by a processor (e.g., CPU 104, NPU 308) of an SOC (e.g., SOC 140) and an access control hardware block (e.g., 130) of an external memory device (e.g., RAM 122).

The order of operations performed in blocks 602-620 is merely illustrative, and the operations of blocks 602-620 may be performed in any order and partially simultaneously in some embodiments. In some embodiments, the method 600 may be performed by a processor of a device independently from, but in conjunction with, an external memory device. For example, the method 600 may be implemented as a software module executing within a processor of an SOC or in dedicated hardware within an SOC that issues commands to attempt to access memory of an external memory device and is otherwise configured to take actions and store data as described.

In block 602, access control of the memory device may be configured and enabled by the access control hardware block. This may be performed as described with reference to blocks 402-414 of the method 400 (FIG. 4), such that an SOC configures the access control of the access control hardware block of the memory device to allow the SOC to read from and/or write to memory within the memory device cell array.

In block 604, the SOC processor may send an access request along with access control ID to the SOC memory controller. For example, as described with reference to FIG. 3, the CPU 104 may generate a memory access request to access specific memory within the RAM cell array 138. The access request may be transmitted by the CPU 104 across the bus 118 to the RAM memory controller 110. The access request may include an access control ID (e.g., security domain ID) to identify that the CPU 104 was the source of the request. As another example, the NPU 308 may transmit an access request including an access control ID to the RAM memory controller 110, in which the access control ID of the NPU 308 is different from the access control ID of the CPU 104.

In block 606, the SOC memory controller may transmit a read/write command including the access control ID to the memory device in response to receiving the access request from the SOC processor. This may be performed as described with reference to block 416 of the method 400 (FIG. 4).

In block 608, the access control hardware block may compare the access request to the access control configuration. For example, as described with reference to FIG. 3, the policy enforce block 136 within the access control hardware block 130 may receive the access request from the PHY 124, and determine whether the access request including a read/write command is allowable based on the access control configuration configured in block 602. The policy enforce block 136 within the access control hardware block 130 may analyze the access request to determine a base address, address range, and security domain ID, and then compare the memory information and security domain ID to the memory access control configuration (e.g., as defined by the access control configuration block 132). The identified memory location and range may be used for identifying memory information within the RAM memory cell array 138. The security ID may identify a security domain of the SOC that initialized the access request, such that the security domain corresponding to the security domain ID requested the read/write operation at the identified memory address and range.

In determination block 610, the access control hardware block 130 of the memory device may determine whether the SOC should be granted access to the memory device memory cell array based on the access request and the access control configuration. The access control hardware block 130 may be configured to allow e.g., implementing policy enforce block 136) access requests to a memory cell array based on specific security domain IDs and corresponding memory address locations and ranges, while denying access requests specifying other security domain IDs that were not included in the configuration of the memory access control.

Figure 7:
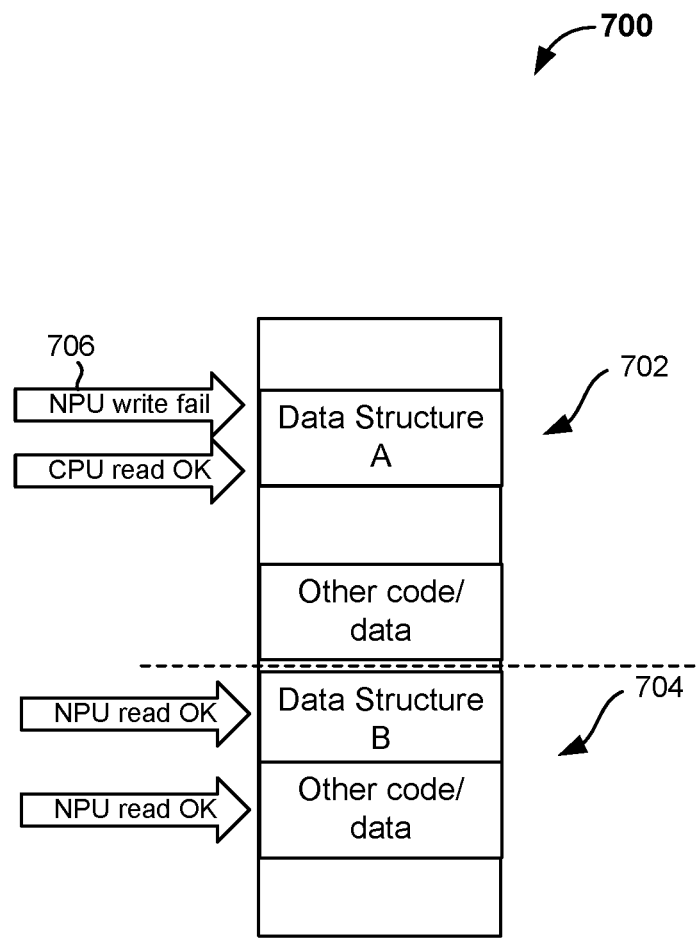
FIG. 7 illustrates a system memory map 700 for providing secure in-memory device access control according to some embodiments.

For example, FIG. 7 illustrates a system memory map 700 for providing secure in-memory device access control according to some embodiments. For this example, it may be assumed that a CPU of an SOC is attributed a security domain ID of 0, and an NPU of the same SOC is attributed a security domain ID of 1. During configuration of the memory access control, the memory device may receive configuration messages including the security domain IDs of 0 and 1 corresponding to the CPU and NPU. The configuration messages may include memory address locations and ranges to which the memory device should allow access based on the corresponding security domain ID. For example, as described in the method 400 (FIG. 4), the memory device may have received configuration messages to configure the access control to allow read/write operation requested by the NPU and CPU for memory address range 704, and to allow read/write operations by the CPU to memory address range 702 while not allowing read/write operations by the NPU to memory address range 702. As another example, the access control may have been configured to allow read operations but not write operations to memory address range 702 except for the CPU, such that all other security domains besides the CPU including the NPU security domain may not write to memory address range 702. Thus, if the NPU performs operation 706 to request to write to the memory address range 702, the policy enforce of the memory device may check that the request includes a security domain ID of 1, determine that only a request including a security domain ID of 0 is allowed to write to memory address range 702, and may deny the request.

Referring back to FIG. 6, in response to determining that the memory address location and range and security domain ID of the access request are not allowed based on the access control configuration (i.e., determination block 610="No"), then the read/write of the access request may not be performed, an error may be recorded (e.g., via access violation syndrome block 134) including the access request information, and a new access request may be performed in block 604.

In response to determining that the memory address location and range and security domain ID of the access request are allowed based on the access control configuration (i.e., determination block 610="Yes"), then the read/write of the access request may be performed in block 612. Block 608, 610 and 612 may allow a plurality of reads and/or write transactions to proceed without having to re-send the access control ID in block 604 and 606. If so, all transactions will be handled as belonging to the current security domain ID that has been provided in block 604 and 606 and each of the individual read or write transactions will be evaluated against the current security domain ID and individually granted or denied access.

In block 614, the SOC memory controller latches the response data and analyzes the error indication signal. For example, as descried with reference to FIG. 3, one or more errors may have occurred during an access request sent to policy enforce block 136, or during a read/write operation to the RAM cell array 138. The access violation syndrome may log any errors, and then send the error information to the SOC across connections 304e and 302e when the SOC sends a command request to retrieve the error information. The RAM memory controller 110 may then latch the response data (e.g., at connection 120d) after the read/write operation is performed, and may check the connection 302e to determine if an error signal is present indicating whether any errors occurred during the access request and/or read/write operation.

In determination block 616, the SOC may determine whether an error occurred based on an error signal received from the memory device. In response to determining that no errors occurred (i.e., determination block 410="No"), no error interrupt is reported to the SOC, and a new access request may be performed according to block 604.

In response to determining that an error occurred (i.e., determination block 410="Yes"), the SOC memory controller may request error information from the memory device in block 618. The error information captured by the access violation syndrome may be transmitted by the memory device to the SOC.

In block 620, the SOC memory controller may save and locally store the error information and then trigger an interrupt to the SOC master control to perform any necessary operations to log and/or remediate the access and/or read/write error.

Figure 8:
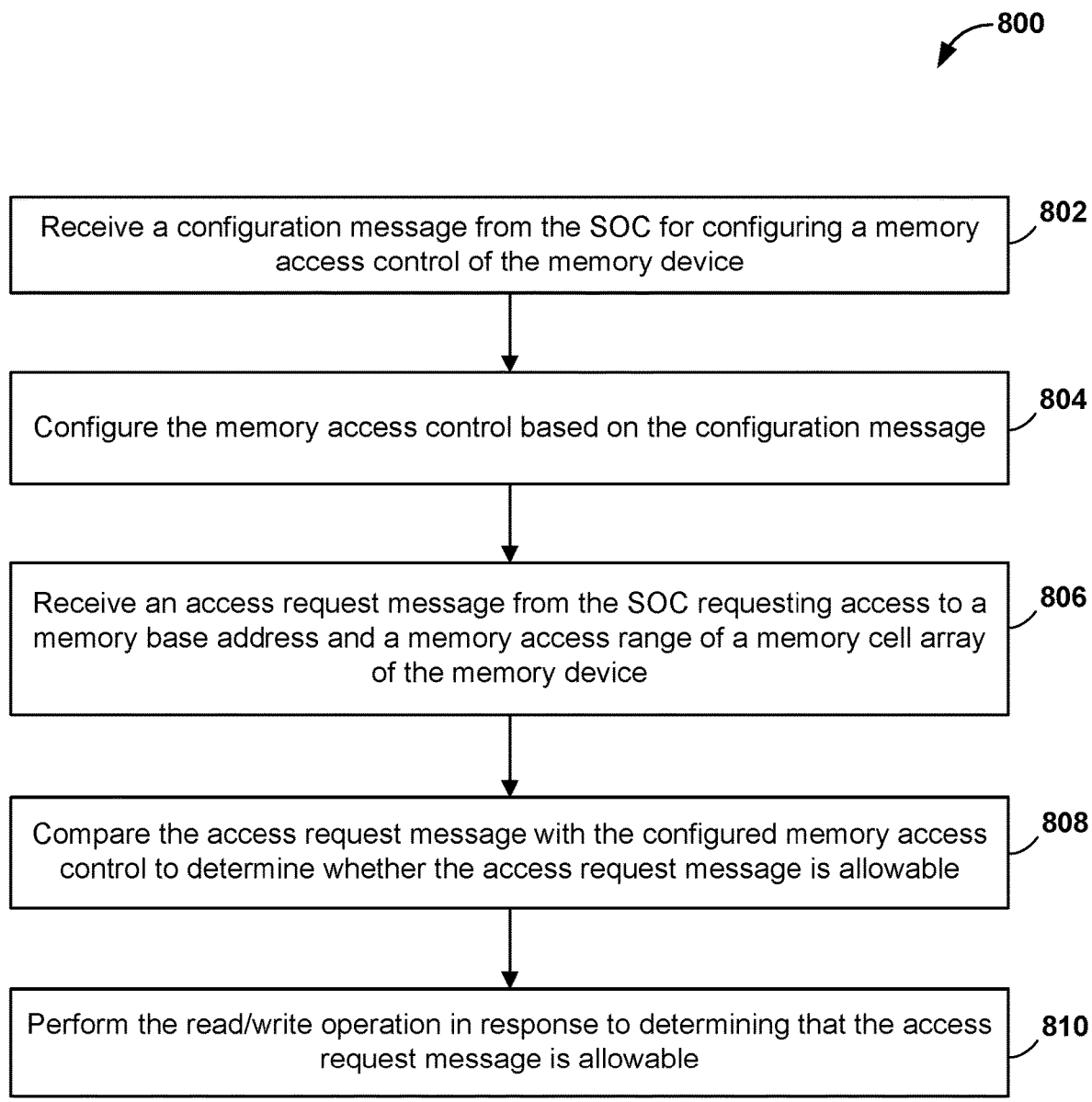
FIG. 8 is a process flow diagram illustrating a method 800 for providing secure in-memory device access of a memory device by a system-on-a-chip (SOC) according to some embodiments.

FIG. 8 is a process flow diagram illustrating a method 800 for providing secure in-memory device access of a memory device by a system-on-a-chip (SOC) according to some embodiments. With reference to FIGS. 1-8, the operations of the method 800 may be performed by an access control hardware block (e.g., 130) in a memory device (e.g., RAM 122) in electrical communication with an external processor (e.g., CPU 104, NPU 308) of an SOC (e.g., SOC 140).

The order of operations performed in blocks 802-810 is merely illustrative, and the operations of blocks 802-810 may be performed in any order and partially simultaneously in some embodiments. In some embodiments, the method 800 may be performed by an access control hardware block within a memory device independently from, but in conjunction with, an external processor of an SOC. For example, the method 800 may be implemented as an access control hardware block, which may be dedicated hardware within the memory device, executing memory access control configuration and mission mode commands received from a processor of an SOC.

In block 802, the access control hardware block may perform operations including receiving a configuration message from the SOC for configuring a memory access control of the memory device. In some embodiments, the configuration message may include a configuration security domain ID used to configure access control by the access control hardware block of the memory device. In some embodiments, the configuration message may be an encoded JEDEC message including the configuration security domain ID.

In block 804, the access control hardware block may perform operations including configuring memory access control based on the configuration message.

In block 806, the access control hardware block may perform operations including receiving an access request message from the SOC requesting access to a memory base address and a memory access range of a memory cell array of the memory device. In some embodiments, the access request message may include a read/write operation. In some embodiments, the access request message may include a requested security domain ID used to identify which security domain of the SOC is requested the read/write operation. In some embodiments, the access request message may be an encoded JEDEC message including the requested security domain ID.

In block 808, the access control hardware block may perform operations including comparing the access request message with the configured memory access control to determine whether the access request message is allowable.

In block 810, the access control hardware block may perform operations including permitting the read/write operation in response to determining that the access request message is allowable.

Figure 9:
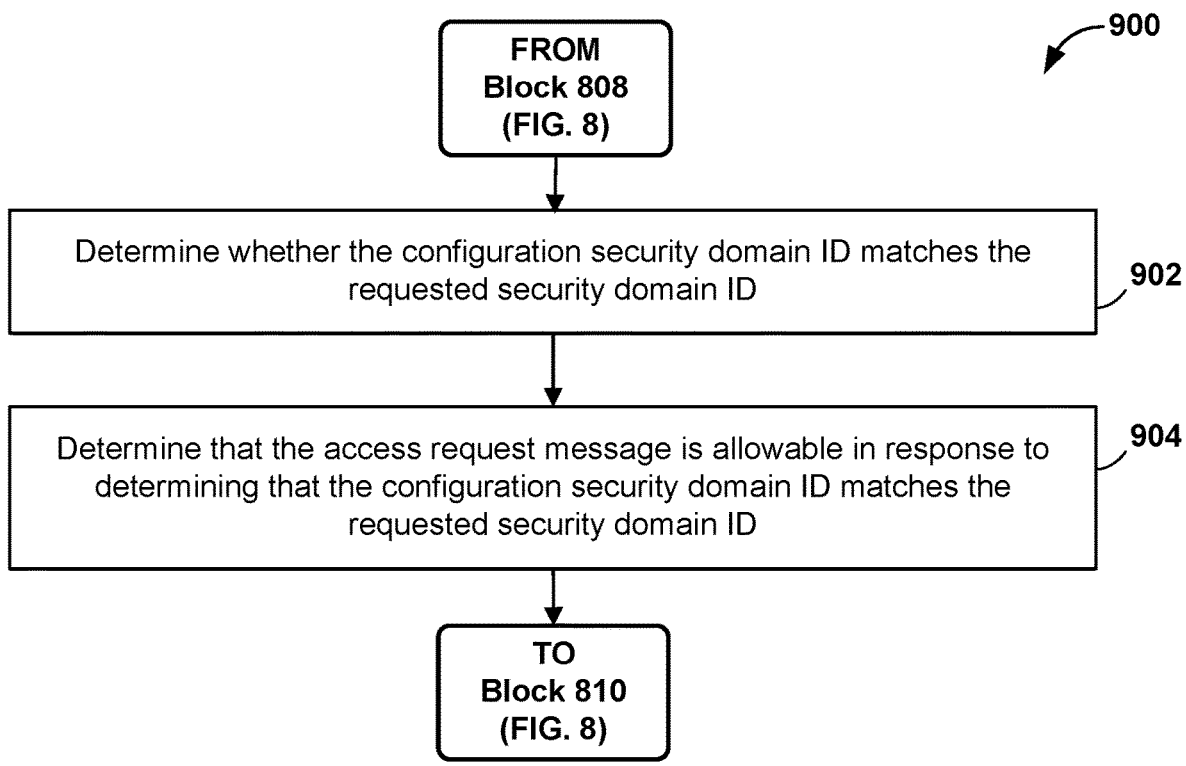
FIG. 9 is a process flow diagram illustrating alternative operations that may be performed by a memory device as part of the method 800 for providing secure in-memory device access of a memory device by a system-on-a-chip (SOC) according to some embodiments.

FIG. 9 is a process flow diagram illustrating alternative operations that may be performed by an access control hardware block as part of the method 800 for providing secure in-memory device access of a memory device by a system-on-a-chip (SOC) according to some embodiments. With reference to FIGS. 1-9, the operations of the method 900 may be performed by an access control hardware block (e.g., 130) in a memory device (e.g., RAM 122) in electrical communication with an external processor (e.g., CPU 104, NPU 308) of an SOC (e.g., SOC 140).

Following performance of the operations of block 808 of the method 800 (FIG. 8), the access control hardware block of the memory device may perform operations including determining whether the configuration security domain ID matches the requested security domain ID in block 902. This may be performed as part of the operations described in block 808 of the method 800 (FIG. 8).

In block 904, the access control hardware block may perform operations including determining that the access request message is allowable in response to determining that the configuration security domain ID matches the requested security domain ID.

The access control hardware block may then perform the operations of block 810 of the method 800 (FIG. 8) as described.

Figure 10:
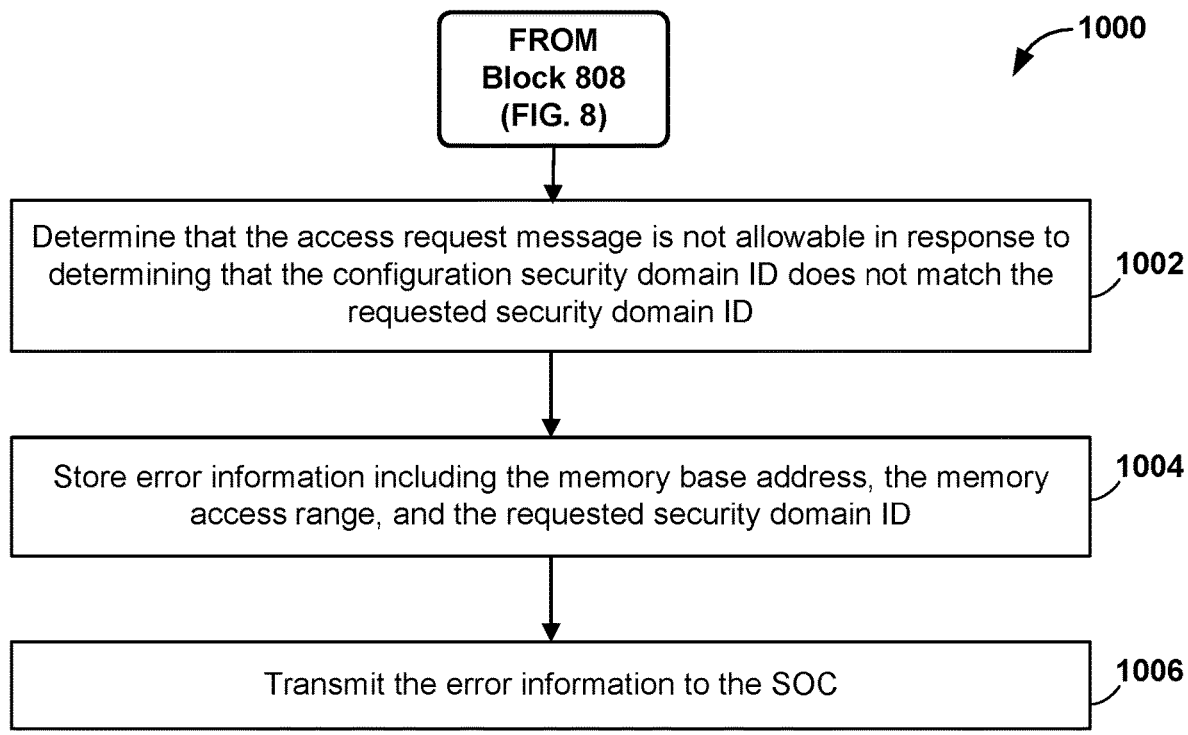
FIG. 10 is a process flow diagram illustrating alternative operations that may be performed by a memory device as part of the method 800 for providing secure in-memory device access of a memory device by a system-on-a-chip (SOC) according to some embodiments.

FIG. 10 is a process flow diagram illustrating alternative operations that may be performed by an access control hardware block of a memory device as part of the method 800 for providing secure in-memory device access of a memory device by a system-on-a-chip (SOC) according to some embodiments. With reference to FIGS. 1-10, the operations of the method 1000 may be performed by an access control hardware block (e.g., 130) of a memory device (e.g., RAM 122) in electrical communication with an external processor (e.g., CPU 104, NPU 308) of an SOC (e.g., SOC 140).

Following performance of the operations of block 808 of the method 800 (FIG. 8), the access control hardware block of the memory device may perform operations including determining that the access request message is not allowable in response to determining that the configuration security domain ID does not match the requested security domain ID in block 1002. This may be performed as part of the processes described in block 808 of the method 800 (FIG. 8).

In block 1004, the access control hardware block may perform operations including storing error information including the memory base address, the memory access range, and the requested security domain ID.

In block 1006, the access control hardware block may perform operations including transmitting the error information to the SOC.

Figure 11:
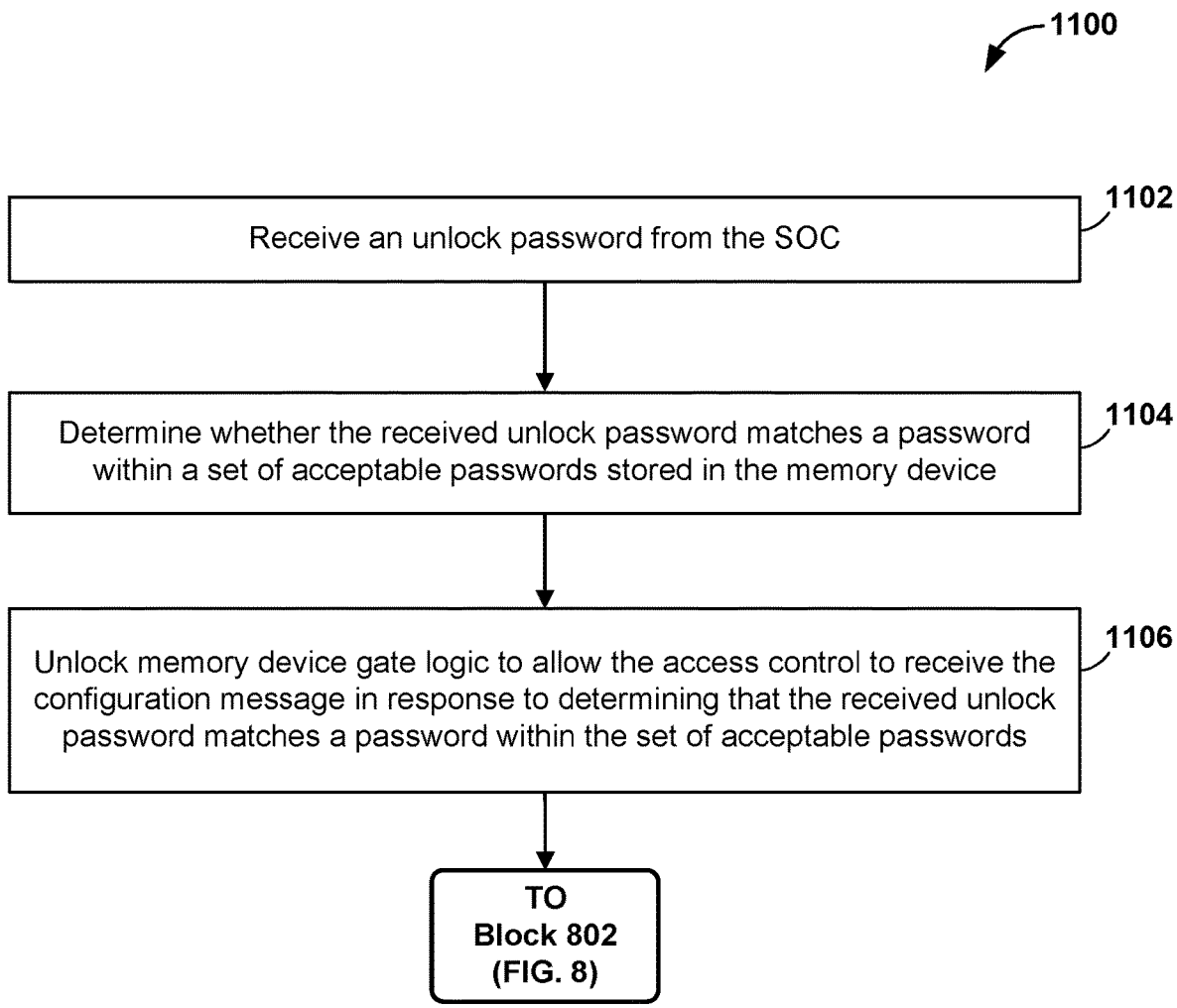
FIG. 11 is a process flow diagram illustrating alternative operations that may be performed by a memory device as part of the method 800 for providing secure in-memory device access of a memory device by a system-on-a-chip (SOC) according to some embodiments.

FIG. 11 is a process flow diagram illustrating alternative operations that may be performed by trust hardware block of a memory device as part of the method 800 for providing secure in-memory device access of a memory device by a system-on-a-chip (SOC) according to some embodiments. With reference to FIGS. 1-11, the operations of the method 1100 may be performed by a trust hardware block (e.g., 125) of a memory device (e.g., RAM 122) in electrical communication with an external processor (e.g., CPU 104, NPU 308) of an SOC (e.g., SOC 140).

In block 1102, the trust hardware block of the memory device may perform operations including receiving an unlock password from the SOC.

In block 1104, the trust hardware block may perform operations including determining whether the received unlock password matches a password within a set of acceptable passwords stored in the memory device.

In block 1106, the trust hardware block may perform operations including unlocking memory device gate logic to allow the access control hardware block to receive the configuration message in response to determining that the received unlock password matches a password within the set of acceptable passwords.

The access control hardware block may then perform the operations of block 802 of the method 800 (FIG. 8) as described.

Figure 12:
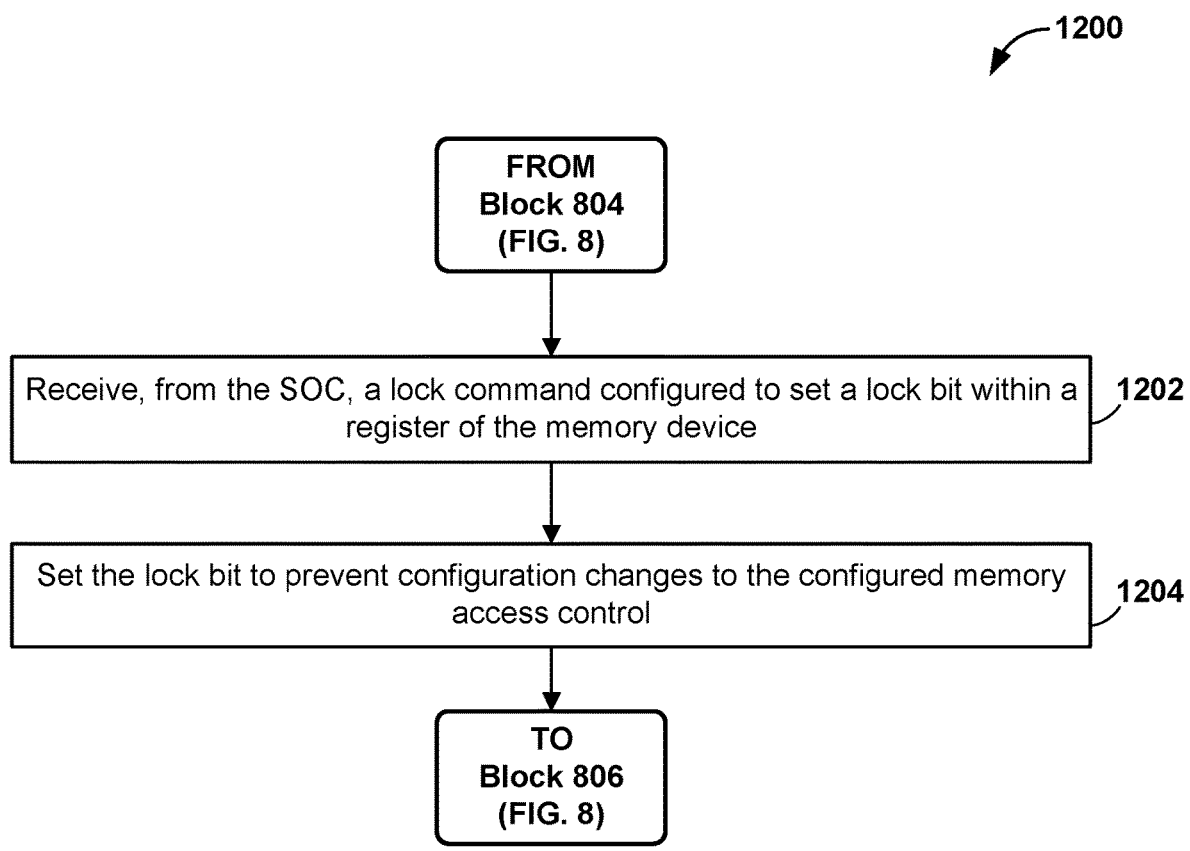
FIG. 12 is a process flow diagram illustrating alternative operations that may be performed by a memory device as part of the method 800 for providing secure in-memory device access of a memory device by a system-on-a-chip (SOC) according to some embodiments.

FIG. 12 is a process flow diagram illustrating alternative operations that may be performed by a memory device as part of the method 800 for providing secure in-memory device access of a memory device by a system-on-a-chip (SOC) according to some embodiments. With reference to FIGS. 1-12, the operations of the method 1200 may be performed by an access control hardware block (e.g., 130) of a memory device (e.g., RAM 122) in electrical communication with an external processor (e.g., CPU 104, NPU 308) of an SOC (e.g., SOC 140).

Following performance of the operations of block 804 of the method 800 (FIG. 8), the access control hardware block of the memory device may perform operations including receiving, from the SOC, a lock command configured to set a lock bit within a register of the memory device in block 1202.

In block 1204, the access control hardware block may perform operations including setting the lock bit to prevent configuration changes to the configured memory access control.

The access control hardware block may then perform the operations of block 806 of the method 800 (FIG. 8) as described.

Figure 13:
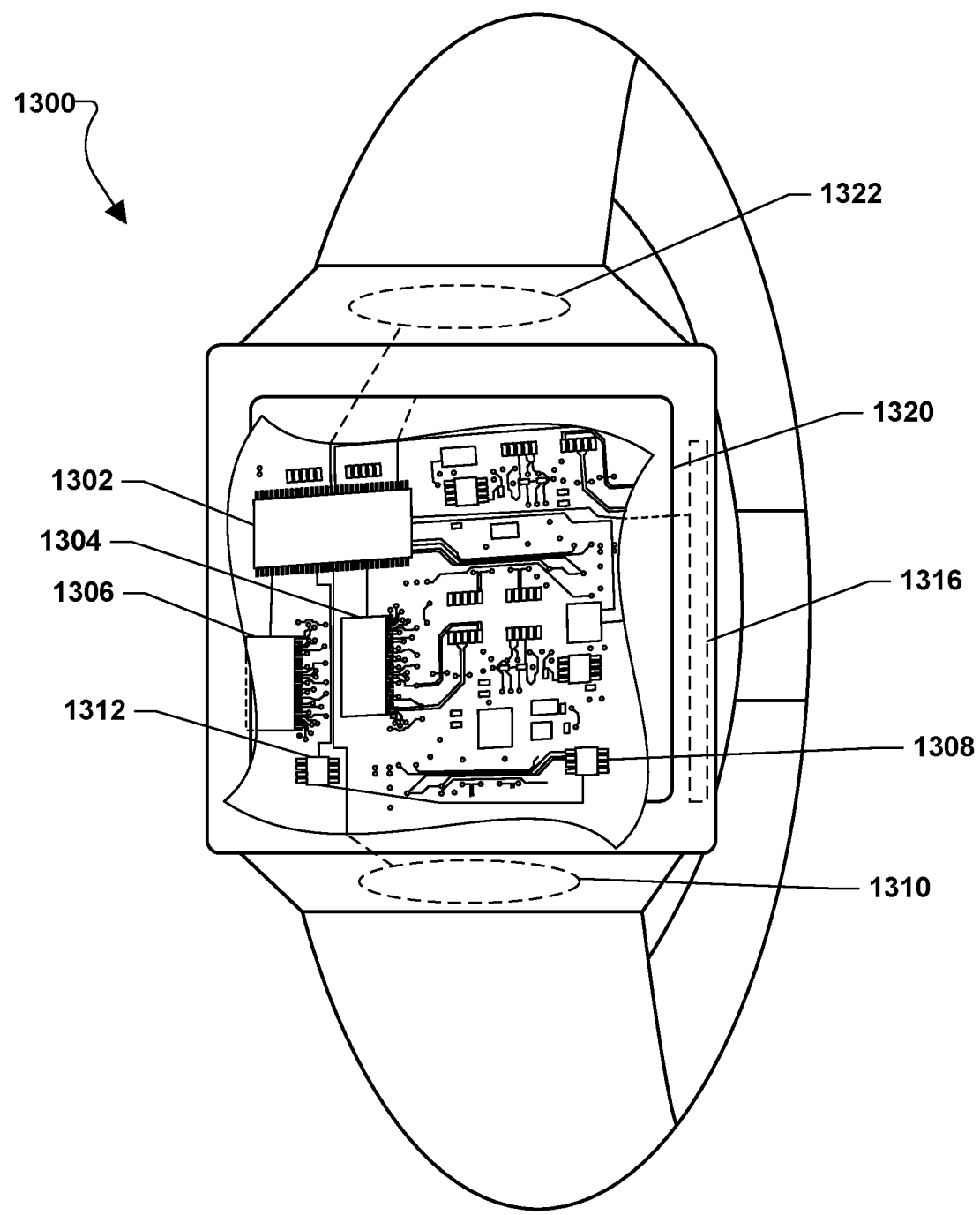
FIG. 13 illustrates an example wearable computing device in the form of a smart watch 1300 according to some embodiments.

The various embodiments may be implemented within a variety of computing devices, such as a wearable computing device. FIG. 13 illustrates an example wearable computing device in the form of a smart watch 1300 according to some embodiments. A smart watch 1300 may include a processor 1302 coupled to internal memories 1304 and 1306. Internal memories 1304, 1306 may be volatile or non-volatile memories, and may also be secure and/or encrypted memories, or unsecure and/or unencrypted memories, or any combination thereof. The processor 1302 may also be coupled to a touchscreen display 1320, such as a resistive-sensing touchscreen, capacitive-sensing touchscreen infrared sensing touchscreen, or the like. Additionally, the smart watch 1300 may have one or more antenna 1308 for sending and receiving electromagnetic radiation that may be connected to one or more wireless data links 1312, such as one or more Bluetooth® transceivers, Peanut transceivers, Wi-Fi transceivers, ANT+ transceivers, etc., which may be coupled to the processor 1302. The smart watch 1300 may also include physical virtual buttons 1322 and 1310 for receiving user inputs as well as a slide sensor 1316 for receiving user inputs.

The wireless data links 1312 and connected transceiver(s) may be used to electrically pair and communicate with external memory devices, such as a RAM/NVRAM coupled to a responding wireless transceiver. For example, as described with reference to FIG. 3, the smart watch 1300 may be temporarily paired with an external memory device (e.g., RAM 122), such that the processor (e.g., CPU 104) may configure the memory access control (e.g., access control hardware block 130) in preparation of issuing commands to access the memory (e.g., RAM cell array 138) of the memory device.

The touchscreen display 1320 may be coupled to a touchscreen interface module that is configured receive signals from the touchscreen display 1320 indicative of locations on the screen where a user's fingertip or a stylus is touching the surface and output to the processor 1302 information regarding the coordinates of touch events. Further, the processor 1302 may be configured with processor-executable instructions to correlate images presented on the touchscreen display 1320 with the location of touch events received from the touchscreen interface module in order to detect when a user has interacted with a graphical interface icon, such as a virtual button.

The processor 1302 may be any programmable microprocessor, microcomputer or multiple processor chip or chips that can be configured by software instructions (applications) to perform a variety of functions, including the functions of the various embodiments. In some devices, multiple processors may be provided, such as one processor dedicated to wireless communication functions and one processor dedicated to running other applications. Typically, software applications may be stored in an internal memory before they are accessed and loaded into the processor 1302. The processor 1302 may include internal memory sufficient to store the application software instructions. In many devices the internal memory may be a volatile or nonvolatile memory, such as flash memory, or a mixture of both. For the purposes of this description, a general reference to memory refers to memory accessible by the processor 1302 including internal memory or removable memory plugged into the mobile device and memory within the processor 1302 itself.

Figure 14:
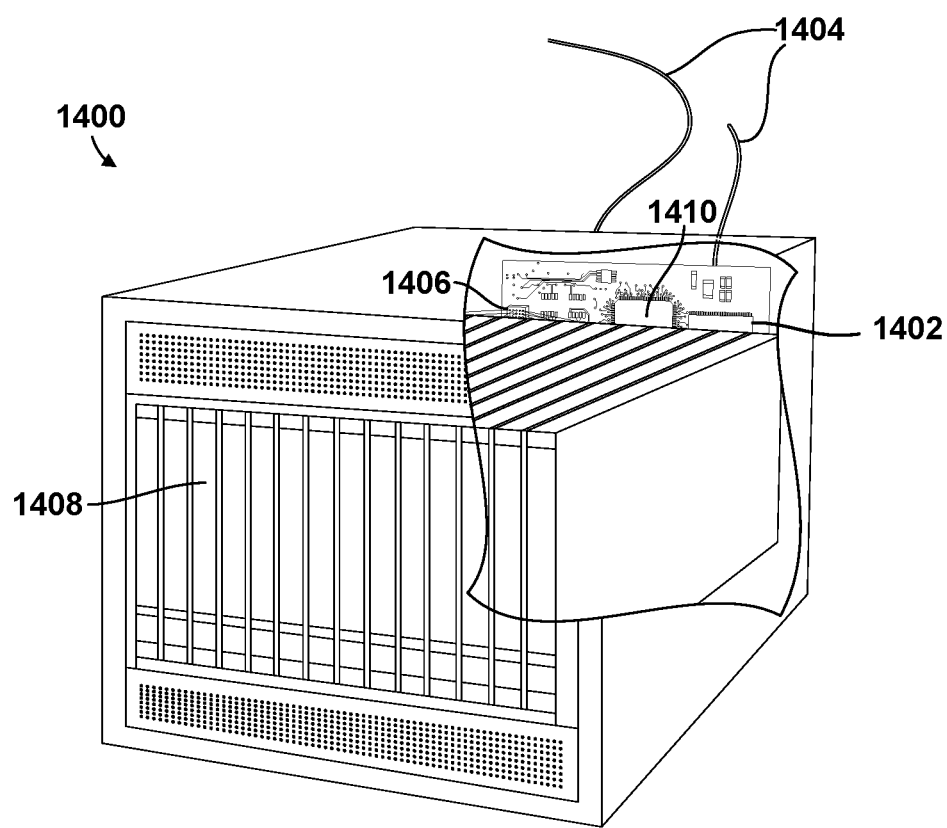
FIG. 14 is a component block diagram of an example of a network computing device 1400 that may provide secure in-memory device access of a memory device by a system-on-a-chip (SOC) according to some embodiments.

FIG. 14 is a component block diagram of an example of a network computing device 1400 that may provide secure in-memory device access of a memory device by a system-on-a-chip (SOC) according to some embodiments. With reference to FIGS. 1-14, a network computing device 1400 may function as a network element of a communication network, such as a base station. The network computing device 1400 may include a processor 1410 (e.g., CPU 104, NPU 308) coupled to volatile memory 1402 and a large capacity nonvolatile memory 1408 (e.g., RAM 122). The network computing device 1400 also may include a peripheral memory access device such as a floppy disc drive, compact disc (CD) or digital video disc (DVD) drive 1406 coupled to the processor 1410. The network computing device 1400 also may include network access ports 1404 (or interfaces) coupled to the processor 1410 for establishing data connections with a network, such as the Internet or a local area network coupled to other system computers and servers. The network computing device 1400 may include one or more antennas 1404 for sending and receiving electromagnetic radiation that may be connected to a wireless communication link. The network computing device 1400 may include additional access ports, such as USB, Firewire, Thunderbolt, and the like for coupling to peripherals, external memory, or other devices.

Figure 15:
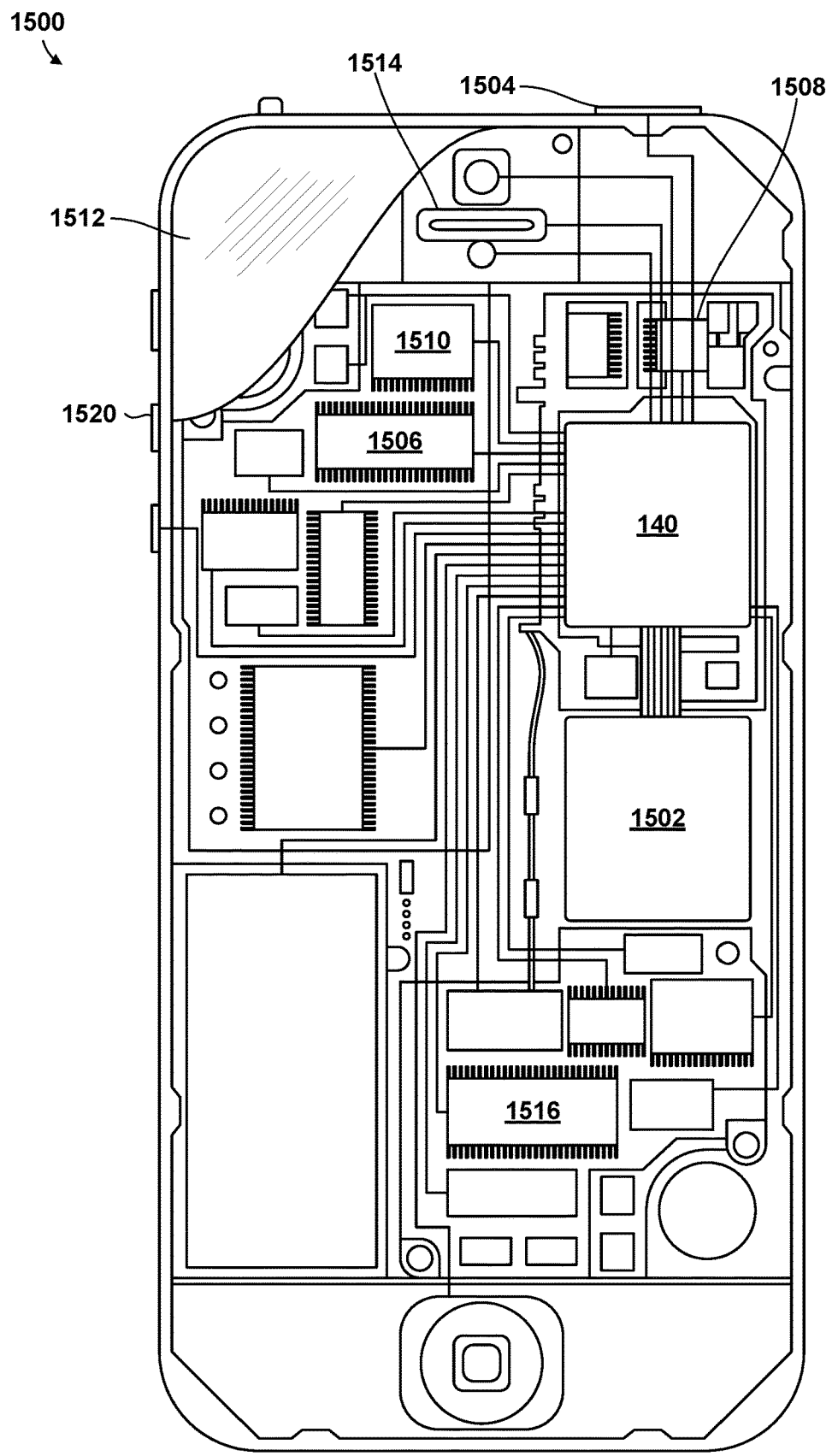
FIG. 15 is a component block diagram of an example wireless device in the of a smartphone 1500 suitable for implementing some embodiments.

FIG. 15 is a component block diagram of an example wireless device in the form of a smartphone 1500 suitable for implementing some embodiments. With reference to FIGS. 1-15, a smartphone 1500 may include a first SOC 140 (such as a SOC-CPU) coupled to a second SOC 1502 (such as a 5G capable SOC). The first and second SOCs 140, 1502 may be coupled to internal memory 1516 (e.g., SRAM 106), a display 1512, and to a speaker 1514. Additionally, the smartphone 1500 may include an antenna 1504 for sending and receiving electromagnetic radiation that may be connected to a wireless data link or cellular telephone transceiver 1508 coupled to one or more processors in the first or second SOCs 140, 1502. For example, the antenna 1504 may be used to electrically connect and issue configuration and mission mode memory access commands to an external memory device (e.g., RAM 122). Smartphones 1500 typically also include menu selection buttons or rocker switches 1520 for receiving user inputs.

A typical smartphone 1500 also includes a sound encoding/decoding (CODEC) circuit 1510, which digitizes sound received from a microphone into data packets suitable for wireless transmission and decodes received sound data packets to generate analog signals that are provided to the speaker to generate sound. Also, one or more of the processors in the first and second SOCs 140, 1502, wireless transceiver 1508, and CODEC 1510 may include a digital signal processor (DSP) circuit (not shown separately).

The processors of the smart watch 1300, the wireless network computing device 1400, and the smart phone 1500 may be any programmable microprocessor, microcomputer or multiple processor chip or chips that may be configured by processor-executable instructions to perform a variety of functions, including the functions of the various embodiments described herein. In some wireless devices, multiple processors may be provided, such as one processor within the SOC 1502 dedicated to wireless communication functions and one processor within the SOC 140 dedicated to running other applications. Typically, software applications (e.g., trusted programs 102, 306) may be stored in the memory 1506, 1516 before they are accessed and loaded into the processor. The processors may include internal memory sufficient to store the application software instructions.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, or a computer. By way of illustration, both an application running on a wireless device and the wireless device may be referred to as a component. One or more components may reside within a process or thread of execution and a component may be localized on one processor or core or distributed between two or more processors or cores. In addition, these components may execute from various non-transitory computer readable media having various instructions or data structures stored thereon. Components may communicate by way of local or remote processes, function or procedure calls, electronic signals, data packets, memory read/writes, and other known network, computer, processor, or process related communication methodologies.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods disclosed herein may be substituted for or combined with one or more operations of the methods disclosed herein.

The foregoing method descriptions and the process flow diagrams are provided merely as illustrative examples and are not intended to require or imply that the blocks of various embodiments may be performed in the order presented. As will be appreciated by one of skill in the art the order of blocks in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules, circuits, and algorithm blocks described in connection with the embodiments disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of various embodiments.

The hardware and data processing apparatus used to implement the various illustrative logics, logical blocks, modules, and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any conventional processor, controller, microcontroller, or state machine. A processor also may be implemented as a combination, such as a combination of a DSP and a microprocessor, a plurality of microprocessors, one or more microprocessors in conjunction with a DSP core, or any other such configuration. In some embodiments, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Embodiments of the subject matter described in this specification also may be implemented as one or more computer programs, i.e. one or more modules of computer program instructions, encoded on a computer storage media for execution by, or to control the operation of, data processing apparatus.

Computer program code or "program code" for execution on a programmable processor for carrying out operations of the various embodiments may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc in which disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the embodiments described in this disclosure may be readily apparent to those skilled in the art, and the generic principles defined herein may be applied to other embodiments without departing from the scope of the claims. Thus, the claims are not intended to be limited to the embodiments shown herein, but are to be accorded the widest scope consistent with this disclosure, the principles and the novel features disclosed herein.

What is claimed is:

1. A method for indicating access pass/violation feedback to a system on chip (SOC) as part of a read/write transaction sequence of a memory device, comprising:
   receiving an unlock password from the SOC;
   closing at least one pass gate to allow a memory access control of the memory device to receive a configuration message in response to the received unlock password matching a password within a set of acceptable passwords;
   receiving the configuration message from the SOC for configuring the memory access control of the memory device;
   configuring the memory access control based on the configuration message;
   receiving an access request message from the SOC requesting access to a memory base address and a memory access range of a memory cell array of the memory device, wherein the access request message includes a read/write operation;
   comparing the access request message with the configured memory access control to determine whether the access request message is allowable; and
   performing the read/write operation in response to determining that the access request message is allowable.

2. The method of claim 1, wherein:
   the configuration message includes a configuration security domain ID; and
   the access request message includes a requested security domain ID.

3. The method of claim 2, wherein comparing the access request message with the configured memory access control to determine whether the access request message is allowable comprises:
   determining whether the configuration security domain ID matches the requested security domain ID; and
   in response to determining that the configuration security domain ID matches the requested security domain ID:
   determining that the access request message is allowable; and
   transmitting a notification to the SOC indicating that the access request message is allowable.

4. The method of claim 3, further comprising:
   in response to determining that the configuration security domain ID does not match the requested security domain ID:
   determining that the access request message is not allowable;
   storing error information including the memory base address, the memory access range, and the requested security domain ID;
   transmitting a notification to the SOC indicating that the access request message is not allowable; and transmitting the error information to the SOC in response to receiving an error interrupt request from the SOC.

5. The method of claim 2, wherein:
the configuration message is an encoded JEDEC message including the configuration security domain ID; and
the access request message is an encoded JEDEC message including the requested security domain ID.

6. The method of claim 1, further comprising:
receiving, from the SOC, a lock command configured to set a lock bit within a register of the memory device; and
setting the lock bit to prevent configuration changes to the configured memory access control.

7. A memory device, comprising:
a memory cell array;
at least one pass gate;
a trust hardware block, wherein the trust hardware block is configured to perform operations comprising:
receiving an unlock password from a system-on-chip (SOC);
closing the at least one pass gate to allow a memory access control hardware block to receive a configuration message in response to the received unlock password matching a password within a set of acceptable passwords; and
wherein the access control hardware block is configured to perform operations comprising:
receiving the configuration message from the SOC for configuring memory access control of the memory device;
configuring memory access control based on the configuration message;
receiving an access request message from the SOC requesting access to a memory base address and a memory access range of the memory cell array, wherein the access request message includes a read/write operation;
comparing the access request message with the configured memory access control to determine whether the access request message is allowable; and
performing the read/write operation in response to determining that the access request message is allowable.

8. The memory device of claim 7, wherein the access control hardware block is configured to perform operations such that:
receiving the configuration message from the SOC comprises receiving a configuration message that includes a configuration security domain ID; and
receiving an access request message from the SOC comprises receiving an access request message that includes a requested security domain ID.

9. The memory device of claim 8, wherein the access control hardware block is configured to perform operations such that comparing the access request message with the configured memory access control to determine whether the access request message is allowable comprises:
determining whether the configuration security domain ID matches the requested security domain ID; and
in response to determining that the configuration security domain ID matches the requested security domain ID:
determining that the access request message is allowable; and
transmitting a notification to the SOC indicating that the access request message is allowable.

10. The memory device of claim 9, wherein the access control hardware block is configured to perform operations further comprising:
in response to determining that the configuration security domain ID does not match the requested security domain ID:
determining that the access request message is not allowable;
storing error information including the memory base address, the memory access range, and the requested security domain ID;
transmitting a notification to the SOC indicating that the access request message is not allowable; and
transmitting the error information to the SOC in response to receiving an error interrupt request from the SOC.

11. The memory device of claim 8, wherein the access control hardware block is configured to perform operations such that:
receiving the configuration message from the SOC comprises receiving an encoded JEDEC message including the configuration security domain ID; and
receiving an access request message from the SOC comprises receiving an encoded JEDEC message including the requested security domain ID.

12. The memory device of claim 7, wherein the access control hardware block is configured to perform operations further comprising:
receiving, from the SOC, a lock command configured to set a lock bit within a register of the memory device; and
setting the lock bit to prevent configuration changes to the configured memory access control.

13. The memory device of claim 7, wherein the trust hardware block comprises:
a fuse memory configured to store a set of acceptable passwords; and
a logic block coupled to the fuse memory and the at least one pass gate and configured to:
signal the at least one pass gate to unlock the memory device gate logic by closing the at least one pass gate in response to the received unlock password matching the password within the set of acceptable passwords stored in the fuse memory.

14. The memory device of claim 7, wherein the access control hardware block comprises:
an access control configuration block;
an access violation syndrome; and
a policy enforcement block.

15. A memory device, comprising:
a memory cell array;
means for receiving an unlock password from a system-on-chip (SOC);
means for closing at least one pass gate to allow a memory access control of the memory device to receive a configuration message in response to the received unlock password matching a password within a set of acceptable passwords;
means for receiving the configuration message from the SOC for configuring the memory access control of the memory device;
means for configuring the memory access control based on the configuration message;
means for receiving an access request message from the SOC requesting access to a memory base address and a memory access range of the memory cell array, wherein the access request message includes a read/write operation;

means for comparing the access request message with the configured memory access control to determine whether the access request message is allowable; and means for performing the read/write operation in response to determining that the access request message is allowable.

16. The memory device of claim 15, wherein:

means for receiving the configuration message from the SOC comprises means for receiving a configuration message that includes a configuration security domain ID; and means for receiving an access request message from the SOC comprises means for receiving an access request message that includes a requested security domain ID.

17. The memory device of claim 16, wherein means for comparing the access request message with the configured memory access control to determine whether the access request message is allowable comprises:

means for determining whether the configuration security domain ID matches the requested security domain ID;

means for determining that the access request message is allowable in response to determining that the configuration security domain ID matches the requested security domain ID; and means for transmitting a notification to the SOC indicating that the access request message is allowable.

18. The memory device of claim 17, further comprising:

means for determining that the access request message is not allowable response to determining that the configuration security domain ID does not match the requested security domain ID;

means for storing error information including the memory base address, the memory access range, and the requested security domain ID;

means for transmitting a notification to the SOC indicating that the access request message is not allowable; and means for transmitting the error information to the SOC in response to receiving an error interrupt request from the SOC.

19. The memory device of claim 16, wherein:

means for receiving the configuration message from the SOC comprises means for receiving an encoded JEDEC message including the configuration security domain ID; and means for receiving an access request message from the SOC comprises means for receiving an encoded JEDEC message including the requested security domain ID.

20. The memory device of claim 15, further comprising:

means for receiving, from the SOC, a lock command configured to set a lock bit within a register of the memory device; and means for setting the lock bit to prevent configuration changes to the configured memory access control.

* * * * *